United States Patent
Nakano et al.

[11] Patent Number: 5,927,182
[45] Date of Patent: Jul. 27, 1999

[54] AUTOMATIC BREAD PRODUCING MACHINE

[75] Inventors: Akihisa Nakano, Kobe; Kouji Noda, Osaka; Hironobu Tanaka, Osaka; Masashi Kanbara, Osaka; Toshikatsu Maeda, Osaka; Takahiro Oshita, Kobe; Yasuhiro Kakimoto, Nara, all of Japan

[73] Assignee: Matsushita Electric Industrial Co., Ltd., Osaka, Japan

[21] Appl. No.: 08/928,469

[22] Filed: Sep. 12, 1997

Related U.S. Application Data

[62] Division of application No. 08/557,813, Nov. 14, 1995, Pat. No. 5,722,314.

[30] Foreign Application Priority Data

| Nov. 14, 1994 | [JP] | Japan | 6-279171 |
| Jan. 6, 1995 | [JP] | Japan | 7-777 |
| Jan. 17, 1995 | [JP] | Japan | 7-4886 |
| Jan. 17, 1995 | [JP] | Japan | 7-4887 |
| Jan. 17, 1995 | [JP] | Japan | 7-4888 |
| Feb. 8, 1995 | [JP] | Japan | 7-20401 |
| Feb. 15, 1995 | [JP] | Japan | 7-27094 |

[51] Int. Cl.⁶ .............................................. A47J 27/00
[52] U.S. Cl. ................................. 99/334; 99/348
[58] Field of Search ........................ 99/331, 326, 348, 99/325, 352, 334; 126/21 A

[56] References Cited

U.S. PATENT DOCUMENTS

| 4,538,509 | 9/1985 | Ojima et al. | 99/348 |
| 4,762,057 | 8/1988 | Hirota et al. | 99/468 X |
| 4,903,587 | 2/1990 | Nagasaka et al. | 99/348 X |
| 4,957,040 | 9/1990 | Nakakura et al. | 99/348 |
| 4,984,512 | 1/1991 | Takahashi et al. | 99/348 X |
| 5,386,763 | 2/1995 | Chen | 99/348 X |
| 5,466,913 | 11/1995 | Tanimoto et al. | 99/348 X |

*Primary Examiner*—Reginald L. Alexander
*Attorney, Agent, or Firm*—Pollock, Vande Sande & Amernick

[57] ABSTRACT

An automatic bread producing apparatus has a baking chamber. A temperature sensor is operative for detecting a temperature within the baking chamber. A first device is operative for detecting a room temperature. A second device is operative for determining a corrective value in response to the room temperature detected by the first device. A third device is operative for correcting a first control temperature into a second control temperature in response to the corrective value determined by the second device. A fourth device is operative for controlling a bread producing process in response to the temperature detected by the temperature sensor and the second control temperature provided by the third device.

4 Claims, 36 Drawing Sheets

FIG. 10

| PROCESS | ROOM TEMP (°C) | CORRECTIVE VALUE dθ (°C) | | | | |
|---|---|---|---|---|---|---|
| | | AGEING | KNEADING | FIRST FERMENT | SECOND FERMENT | BAKING |
| HIGH-TEMP PROCESS | 30 OR HIGHER | 0 | 0 | 0 | 0 | 0 |
| MID-TEMP PROCESS | 26~30 | 0 | 0 | 0 | 0 | 0 |
| | 22~26 | 0 | 0 | 0 | 0 | 0 |
| LOW-TEMP PROCESS | 15~22 | -1 | -1 | -1.3 | -1.3 | -5 / -5 |
| | 7.5~15 | -2.3 | -2.3 | -3.1 | -3.1 | -12 / -10 |
| | BELOW 7.5 | -3.5 | -3.5 | -4 | -4 | -20 / -15 |

| COEFFICIENT A | COEFFICIENT B |
|---|---|
| 2.5 | 2 |
| 2 | 1 |
| 1.5 | 0 |
| 1 | -1 |
| 0.5 | -2 |
| 0.25 | — |

FIG. 17

| CODE WORD | STEP |
|---|---|
| 1 | AGEING |
| 2 | KNEADING |
| 3 | FIRST FERMENT |
| 4 | SECOND FERMENT |
| 5 | SHAPING FERMENT |
| 6 | BAKING PEAK |
| 7 | BAKING TEMP CONTROL |
| 8 | RESERVED |

FIG. 18

| CODE WORD | CORRECTIVE VALUE SHIFT (°C) |
|---|---|
| 1 | -1.5 |
| 2 | -1 |
| 3 | -0.5 |
| 4 | 0 |
| 5 | +0.5 |
| 6 | +1 |
| 7 | +1.5 |
| 8 | +2 |

AUTOMATIC BREAD PRODUCING MACHINE

This application is a divisional of U.S. patent application Ser. No. 08/557,813, filed Nov. 14, 1995, now U.S. Pat. No. 5,722,314.

BACKGROUND OF THE INVENTION

1. Field of the Invention

This invention relates to an automatic bread producing machine or apparatus.

2. Description of the Prior Art

Japanese published unexamined utility-model application 1-145329 discloses a full automatic bread producing apparatus which includes a baking device having a heater within a baking chamber. The apparatus of Japanese application 1-145329 also includes a mixing device having a bread mold and kneading blades. The bread mold is detachably mounted within the baking chamber. The kneading blades are driven by a motor. In addition, the apparatus of Japanese application 1-145329 includes a yeast supplying device for feeding yeast into the bread mold, and a dried fruit supplying device for feeding dried fruits into the bread mold.

Japanese published examined patent application 6-79581 discloses a bread producing apparatus with a clock. The apparatus of Japanese application 6-79581 includes means for measuring the present time, and a memory storing information of a predetermined time period required for baking. An expected moment of termination of baking is calculated by adding the predetermined time period to the present time. In the apparatus of Japanese application 6-79581, the calculated moment of termination of baking is automatically indicated on a display when a bread producing process starts.

SUMMARY OF THE INVENTION

It is an object of this invention to provide an improved automatic bread producing apparatus.

A first aspect of this invention provides an automatic bread producing apparatus comprising a baking chamber; a temperature sensor for detecting a temperature within the baking chamber; first means for detecting a room temperature; second means for determining a corrective value in response to the room temperature detected by the first means; third means for correcting a first control temperature into a second control temperature in response to the corrective value determined by the second means; and fourth means for controlling a bread producing process in response to the temperature detected by the temperature sensor and the second control temperature provided by the third means.

A second aspect of this invention is based on the first aspect thereof, and provides an automatic bread producing apparatus wherein the first means comprises means for using the temperature detected by the temperature sensor, which occurs immediately after the bread producing process starts, as the room temperature.

A third aspect of this invention is based on the first aspect thereof, and provides an automatic bread producing apparatus wherein the second means comprises means for selecting one of plural preset values as the determined corrective value.

A fourth aspect of this invention is based on the first aspect thereof, and provides an automatic bread producing apparatus wherein the corrective value determined by the second means corresponds to a coefficient in an equation providing a relation between the second control temperature and the corrective value.

A fifth aspect of this invention is based on the first aspect thereof, and provides an automatic bread producing apparatus wherein the second means comprises means for selecting one of an aging step, a kneading step, a fermenting step, and a baking step, and means for determining the corrective value in response to the selected one of the aging step, the kneading step, the fermenting step, and the baking step.

A sixth aspect of this invention is based on the first aspect thereof, and provides an automatic bread producing apparatus further comprising rotatable kneading blades, means for detecting a rotational speed of the kneading blades, and means for reducing the rotational speed of the kneading blades when the detected rotational speed of the kneading blades exceeds a given speed.

A seventh aspect of this invention is based on the first aspect thereof, and provides an automatic bread producing apparatus further comprising rotatable kneading blades, a motor for rotating the kneading blades, means for detecting a current flowing through the motor, and means for reducing the motor current when the detected motor current exceeds a given current.

An eighth aspect of this invention is based on the first aspect thereof, and provides an automatic bread producing apparatus further comprising rotatable kneading blades, a motor for rotating the kneading blades, means for detecting an intensity of sound generated by the kneading blades, and means for deactivating the motor when the detected sound intensity exceeds a given intensity.

A ninth aspect of this invention provides an automatic bread producing apparatus comprising first means for executing a step of mixing bread ingredients; second means for adding a food into a mixture of the bread ingredients at a moment during the mixing step executed by the first means; and third means for enabling the first means to continue the mixing step during a constant time after the moment of adding the food into the mixture by the second means.

A tenth aspect of this invention is based on the ninth aspect thereof, and provides an automatic bread producing apparatus further comprising fourth means for detecting a room temperature, fifth means for adjusting a time interval of the mixing step executed by the first means in response to the room temperature detected by the fourth means, and sixth means for adjusting the moment of adding the food into the mixture by the second means in response to the room temperature detected by the fourth means so that a part of the time interval of the mixing step executed by the first means which occurs after the moment of adding the food into the mixture will be equal to the constant time.

An eleventh aspect of this invention provides an automatic bread producing apparatus comprising a baking chamber; a temperature sensor for detecting a temperature within the baking chamber; first means for executing a step of mixing bread ingredients; second means for adding a food into a mixture of the bread ingredients at a moment during the mixing step executed by the first means; third means for enabling the first means to continue the mixing step during an adjustable time after the moment of adding the food into the mixture by the second means; and fourth means for adjusting the adjustable time in response to the temperature within the baking chamber which is detected by the temperature sensor.

A twelfth aspect of this invention provides an automatic bread producing apparatus comprising first means for executing a step of mixing bread ingredients; second means for adding a food into a mixture of the bread ingredients at a moment during the mixing step executed by the first means; third means for enabling the first means to continue the mixing step during an adjustable time after the moment of adding the food into the mixture by the second means; and fourth means for adjusting the adjustable time in response to conditions of a bread producing process.

A thirteenth aspect of this invention is based on the ninth aspect thereof, and provides an automatic bread producing apparatus wherein the second means comprises means for adding a first portion of the food into the mixture at a first moment during the mixing step, and means for adding a second portion of the food into the mixture at a second moment during the mixing step, the second portion differing from the first portion, the second moment differing from the first moment.

A fourteenth aspect of this invention provides an automatic bread producing apparatus comprising first means for measuring a present time; second means for selecting one of plural menus corresponding to different bread producing processes respectively, the bread producing processes having different predetermined duration intervals respectively; third means for calculating an expected moment of termination of the bread producing process corresponding to the selected menu in response to the present time measured by the first means and the predetermined duration interval of the bread producing process corresponding to the selected menu; and fourth means for displaying the expected moment of termination which is calculated by the third means when one of the plural menus is selected by the second means.

A fifteenth aspect of this invention is based on the fourteenth aspect thereof, and provides an automatic bread producing apparatus further comprising fifth means for displaying the expected moment of termination which is calculated by the third means during a given time interval from a start of the bread producing process corresponding to the selected menu, sixth means for calculating a remaining time to the termination of the bread producing process corresponding to the selected menu, and seventh means for displaying the remaining time calculated by the sixth means after the given time interval ends.

A sixteenth aspect of this invention is based on the fourteenth aspect thereof, and provides an automatic bread producing apparatus further comprising fifth means for periodically generating a sound when the bread producing process corresponding to the selected menu has been completed.

A seventeenth aspect of this invention provides an automatic bread producing apparatus comprising first means for detecting a room temperature; and second means for determining that cold water should be used in bread ingredients in response to the room temperature detected by the first means.

An eighteenth aspect of this invention is based on the seventeenth aspect thereof, and provides an automatic bread producing apparatus wherein the second means comprises means for deciding whether or not the room temperature detected by the first means is higher than a predetermined reference temperature, and means for informing that cold water should be used in bread ingredients when the room temperature is higher than the reference temperature.

BRIEF DESCRIPTION OF THE DRAWINGS

FIG. 10 is a diagram of corrective values which depend on various conditions.

FIG. 17 is a diagram of the relation between code words and different steps in the apparatus of FIG. 16.

FIG. 18 is a diagram of the relation between code words and corrective-value shift amounts in the apparatus of FIG. 16.

DESCRIPTION OF THE PREFERRED EMBODIMENTS

Prior-art automatic bread producing apparatuses will be described hereinafter for a better understanding of this invention.

Figure 1:
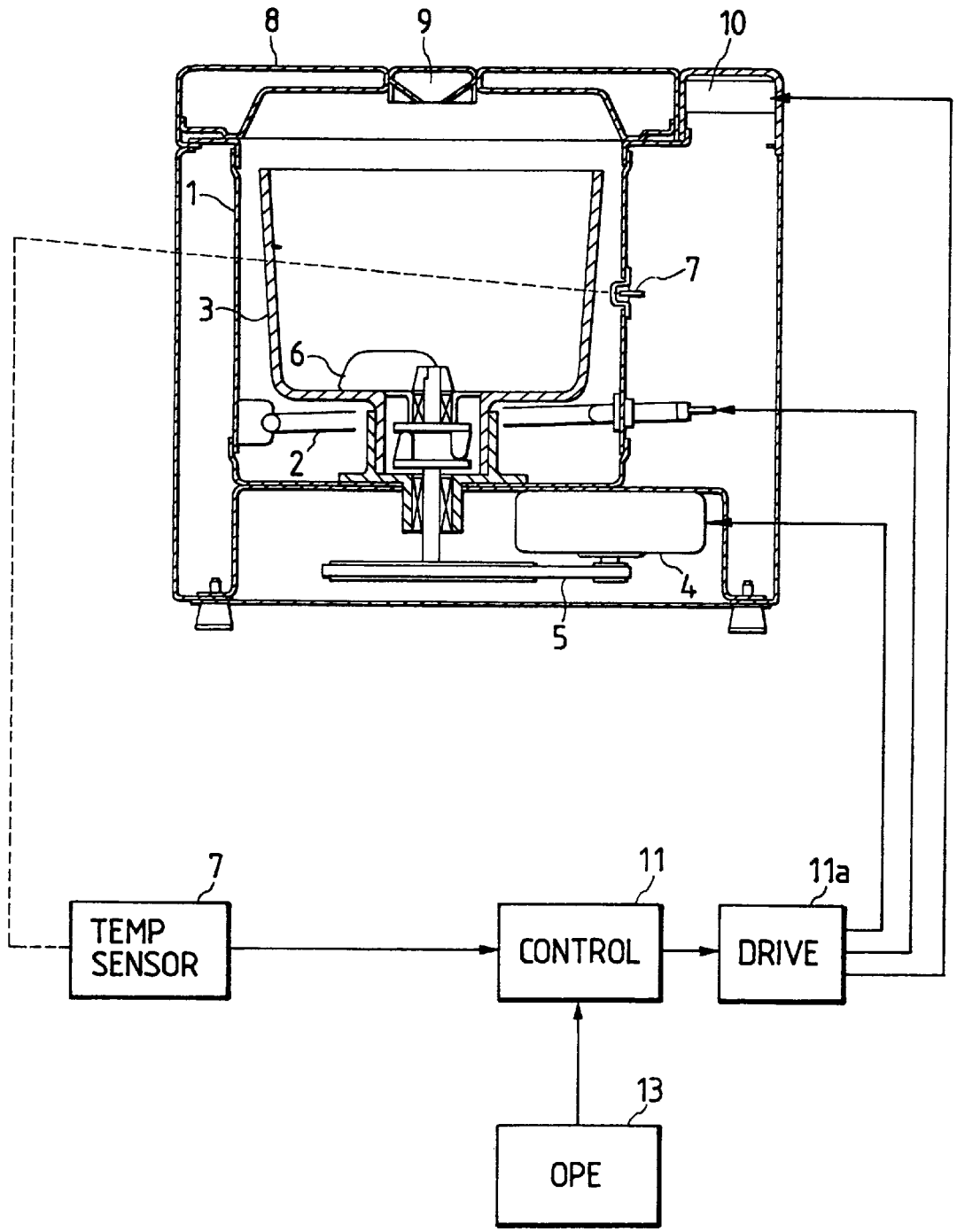
FIG. 1 is a diagram of a first prior-art automatic bread producing apparatus.

FIG. 1 shows a first prior-art automatic bread producing apparatus which has a baking chamber 1 in which a heater 2 is disposed. A bread vessel 3 is detachably mounted within the baking chamber 1. A motor 4 located outside the baking chamber 1 is coupled via a belt 5 to rotatable mixing vanes (rotatable kneading blades) 6 to drive the mixing vanes 6. The mixing vanes 6 extend in a bottom region of the baking chamber 1.

In the prior-art apparatus of FIG. 1, a sensor 7 detects a temperature within the baking chamber 1. A movable lid 8 selectively opens and closes an upper end of the baking chamber 1. The lid 8 has an opening 9 for feeding yeast into the bread vessel 3. A valve selectively blocking and unblocking the yeast feed opening 9 is driven by a solenoid or an electromagnetic actuator 10.

In the prior-art apparatus of FIG. 1, a controller 11 including a microcomputer or a similar device is informed by the temperature sensor 7 of the detected temperature within the baking chamber 1. An operation device 13 electrically connected to the controller 11 has manual switches or manual keys operated by a user. The controller 11 is informed by the operation device 13 of various commands including a bread-production start command. A drive circuit 11a is electrically connected between the controller 11 and the actuators 2, 4, and 10. The drive circuit 11a serves as an interface between the controller 11 and the actuators 2, 4, and 10. The controller 11 generates signals or information pieces for control of the actuators 2, 4, and 10 in response to the temperature information and the start command. The controller 11 outputs the generated control signals (the control information pieces) to the drive circuit 11a. Then, the control information pieces are transmitted to the actuators 2, 4, and 10 via the drive circuit 11a. The actuators 2, 4, and 10 are controlled in response to the control signals (the control information pieces). In this way, the controller 11 controls the actuators 2, 4, and 10 in response to the temperature information and the start command.

Figure 2:
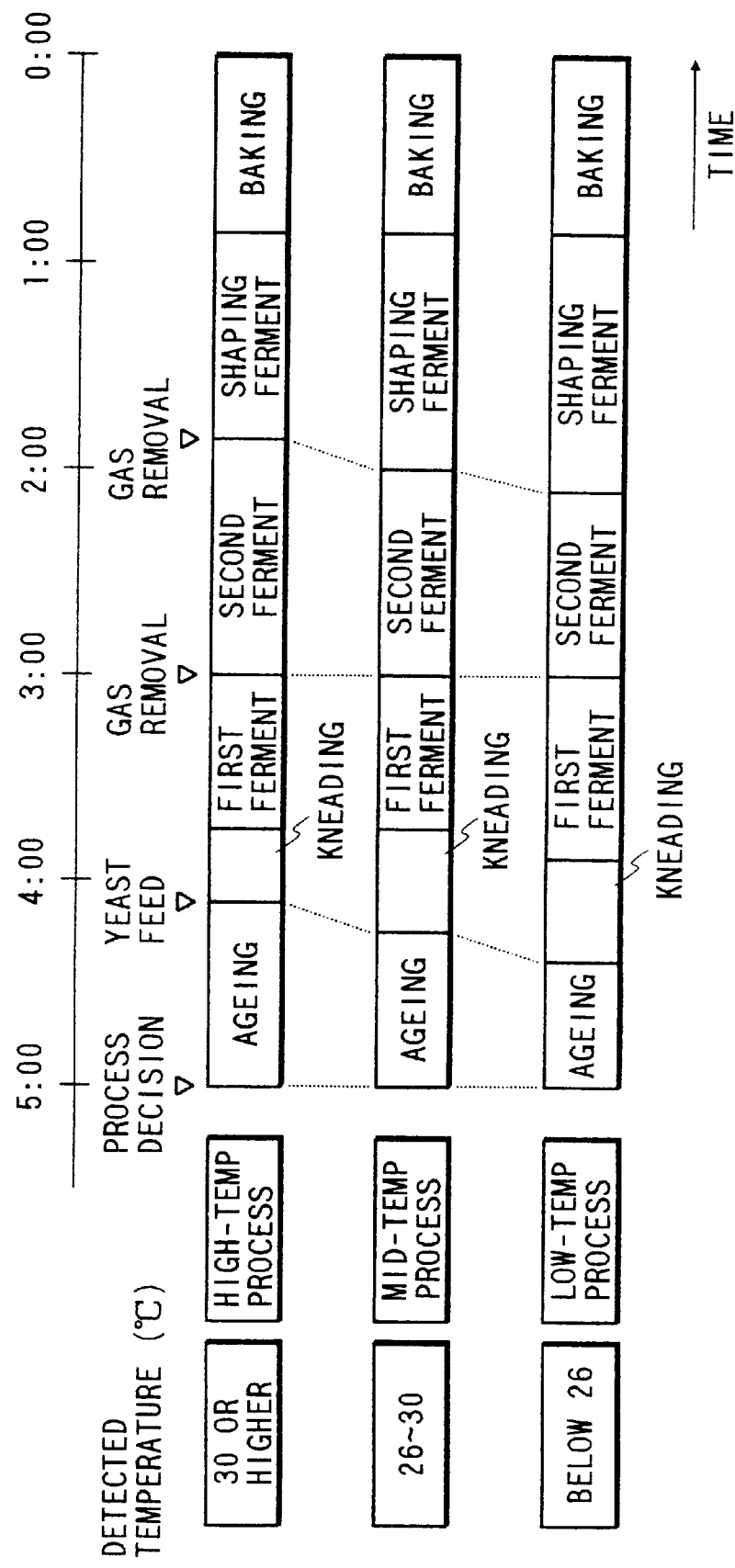
FIG. 2 is a time-domain diagram of sequences of steps in bread producing processes executed by the prior-art apparatus of FIG. 1.

FIG. 2 shows different sequences of bread producing steps executed by the prior-art apparatus of FIG. 1. In FIG. 2, there are a high-temperature process, an intermediate-temperature process, and a low-temperature process related to the respective sequences of bread producing steps. Here, the high-temperature process, the intermediate-temperature process, and the low-temperature process mean processes suited for a high room temperature, an intermediate room temperature, and a low room temperature respectively. The controller 11 is programmed to implement the following functions. One of the high-temperature process, the intermediate-temperature process, and the low-temperature process is selected in response to the detected temperature within the baking chamber 1 which occurs immediately after the start of bread production. In this case, the detected temperature within the baking chamber 1 corresponds to a room temperature. Specifically, the high-temperature process is selected when the detected temperature (the room temperature) is equal to or higher than 30° C. The low-temperature process Is selected when the detected temperature (the room temperature) is lower than 26° C. The intermediate-temperature process is selected when the detected temperature (the room temperature) is between 26° C. and 30° C. Then, the sequence of bread producing steps which corresponds to the selected process is executed according to step-time and temperature controlling conditions.

In the prior-art apparatus of FIGS. 1 and 2, since the temperature sensor 7 is separate from the walls of the bread vessel 3, the temperature information provided by the temperature sensor 7 tends to inaccurately reflect the temperature within the bread vessel 3. In the prior-art apparatus of FIGS. 1 and 2, the low-temperature process is selected when the detected temperature (the room temperature) is lower than 26° C. Accordingly, the low-temperature process is selected at both temperatures of 5° C. and 20° C. In general, there is a considerable difference in quality conditions between bread produced by the low-temperature process at a room temperature of 5° C. and bread produced by the low-temperature process at a room temperature of 20° C.

A second prior-art automatic bread producing apparatus is similar to the prior-art apparatus of FIGS. 1 and 2 except for the following design change. In the second prior-art apparatus, during an initial stage of a mixing step (a kneading step), a motor 4 (see FIG. 1) is periodically activated and deactivated at short intervals to prevent ingredient flour from flying about. During the later stage of the mixing step, the motor 4 continues to be activated.

In the second prior-art apparatus, the interval of the mixing step remains fixed as long as a room temperature is unchanged. During continuous activation of the motor 4 (see FIG. 1), there sometimes occurs the following phenomenon. Dough (paste of bread) floats on mixing vanes 6 (see FIG. 1), and is thus not kneaded. In this case, the mixing vanes 6 race or idle. The second prior-art apparatus can not counteract such a phenomenon.

Figure 3:
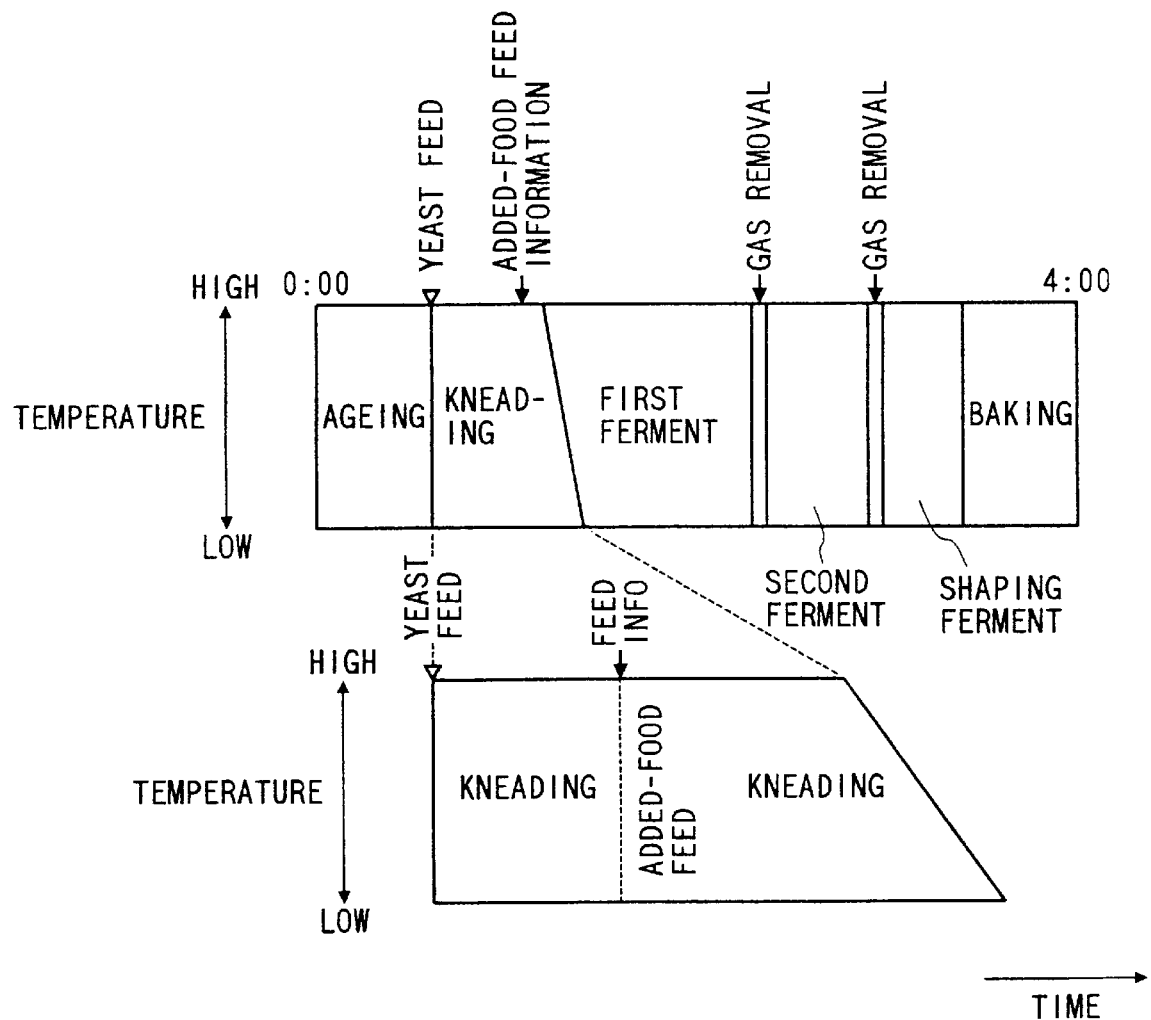
FIG. 3 is a time-domain diagram of a sequence of steps in a bread producing process executed by a third prior-art automatic bread producing apparatus.

A third prior-art automatic bread producing apparatus is similar to the prior-art apparatus of FIGS. 1 and 2 except for a design change indicated later. FIG. 3 shows a sequence of steps of producing a food-added bread which is executed by the third prior-art apparatus. Examples of the added foods are raisins and walnut fragments. With reference to FIG. 3, there occurs information of a requirement for added-food feed at a moment a given time after the start of a mixing step (a kneading step). Upon the occurrence of the information, a lid 8 (see FIG. 1) is opened to enable the feed of added food into a bread vessel 3 (see FIG. 1).

In the third prior-art apparatus, to enable the feed of added food into the bread vessel 3 (see FIG. 1), the lid 8 (see FIG. 1) needs to be opened. Opening the lid 8 (see FIG. 1) tends to cause a delay of the feed of added food.

A fourth prior-art automatic bread producing apparatus is similar to the third prior-art automatic bread producing apparatus except for the following design changes. In the fourth prior-art apparatus, a lid 8 (see FIG. 1) is provided with an added-food feeder. At a fixed timing within an interval of a mixing step (a kneading step), the added-food feeder is activated to execute the feed of added food into a bread vessel 3 (see FIG. 1). In the fourth prior-art apparatus, the interval of the mixing step is varied as a function of a room temperature and a bread-mold temperature so that completed dough (paste of bread) in desired conditions can be attained independent of the room temperature and the bread-mold temperature. Specifically, the interval of the mixing step is increased as the room temperature or the bread-mold temperature drops. In the fourth prior-art apparatus, the position of the timing of the execution of the added-food feed is fixed relative to the start of the interval of the mixing step.

In the fourth prior-art apparatus, the interval of the mixing step depends on the room temperature or the bread-mold temperature while the position of the timing of the execution of the added-food feed is fixed relative to the start of the interval of the mixing step. Therefore, in the fourth prior-art apparatus, a later part of the interval of the mixing step which follows the timing of the execution of the added-food feed varies in accordance with the room temperature or the bread-mold temperature. The variation in the later part of the interval of the mixing step tends to cause a change in conditions of a resultant mixture of bread paste and added food.

Figure 4:
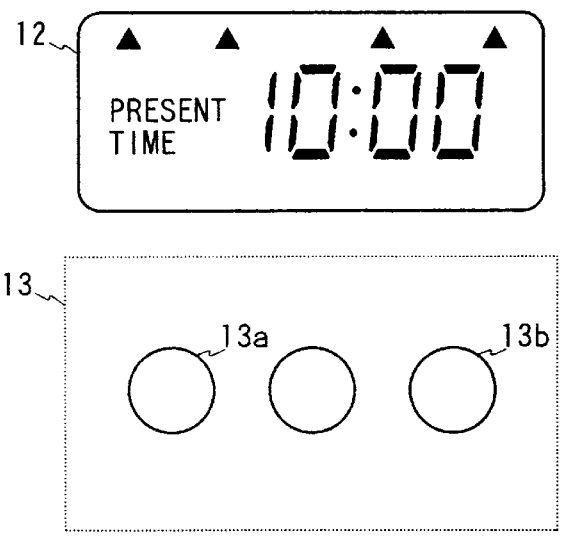
FIG. 4 is a plan view of a display and an operation device in a fifth prior-art automatic bread producing apparatus.

FIG. 4 shows a part of a fifth prior-art automatic bread producing apparatus which is similar to the prior-art apparatus of FIGS. 1 and 2 except for the following design change. With reference to FIG. 4, the fifth prior-art apparatus includes a display 12 and an operation device 13. The operation device 13 has various keys containing a menu key 13a and a start key 13b. In the fifth prior-art apparatus, the display 12 indicates the present time when the menu key 13a is actuated. The display 12 indicates the expected time of termination of bread production instead of the present time after the start key 13b is actuated to start bread production.

In the fifth prior-art apparatus, the actuation of the menu key 13a does not cause the display 12 to indicate the expected time of termination of bread production.

A sixth prior-art automatic bread producing apparatus is similar to the prior-art apparatus of FIGS. 1 and 2 except that several beeps each having a duration of 0.3 are sequentially generated when all bread producing steps have been completed.

The sixth prior-art apparatus can not counteract the case where a user fails to hear the beeps.

Figure 5:
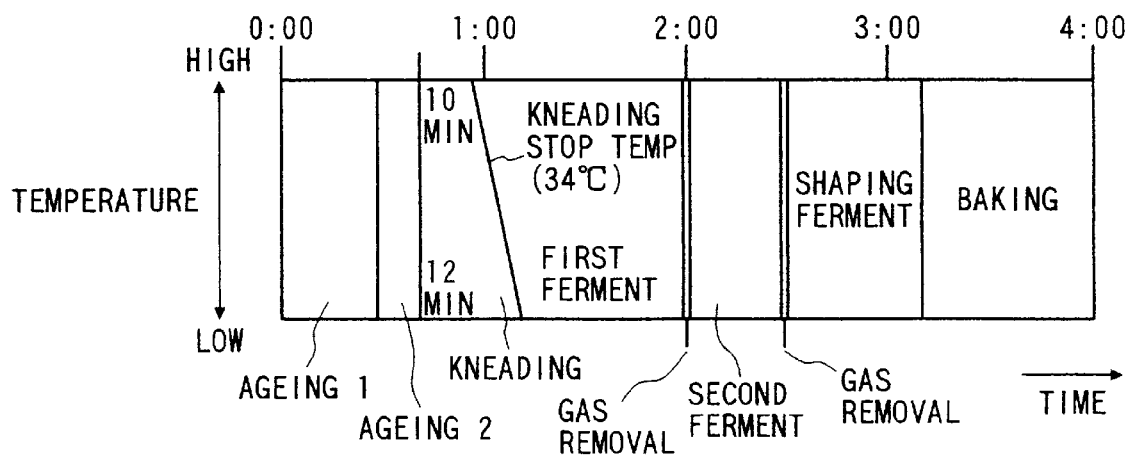
FIG. 5 is a time-domain diagram of a sequence of steps in a bread producing process executed by a seventh prior-art automatic bread producing apparatus.

A seventh prior-art automatic bread producing apparatus is similar to the prior-art apparatus of FIGS. 1 and 2 except for a design change indicated later. FIG. 5 shows a sequence of bread producing steps executed by the seventh prior-art apparatus. With reference to FIG. 5, in the seventh prior-art apparatus, the interval of a mixing step (a kneading step) is decreased as a detected temperature within a baking chamber 1 (see FIG. 1) rises. The interval of the mixing step is variable between 10 minutes and 12 minutes. A shorter interval of the mixing step causes a reduction in an amount of resultant gluten. Accordingly, an instruction manual for the seventh prior-art apparatus notes that cold water should be used as a bread ingredient for producing bread of a special type when a room temperature is equal to or higher than 25° C. The use of cold water results in a longer interval of the mixing step.

Regarding the seventh prior-art apparatus, a user tends to frequently forget the note in the instruction manual.

First Embodiment

Figure 6:
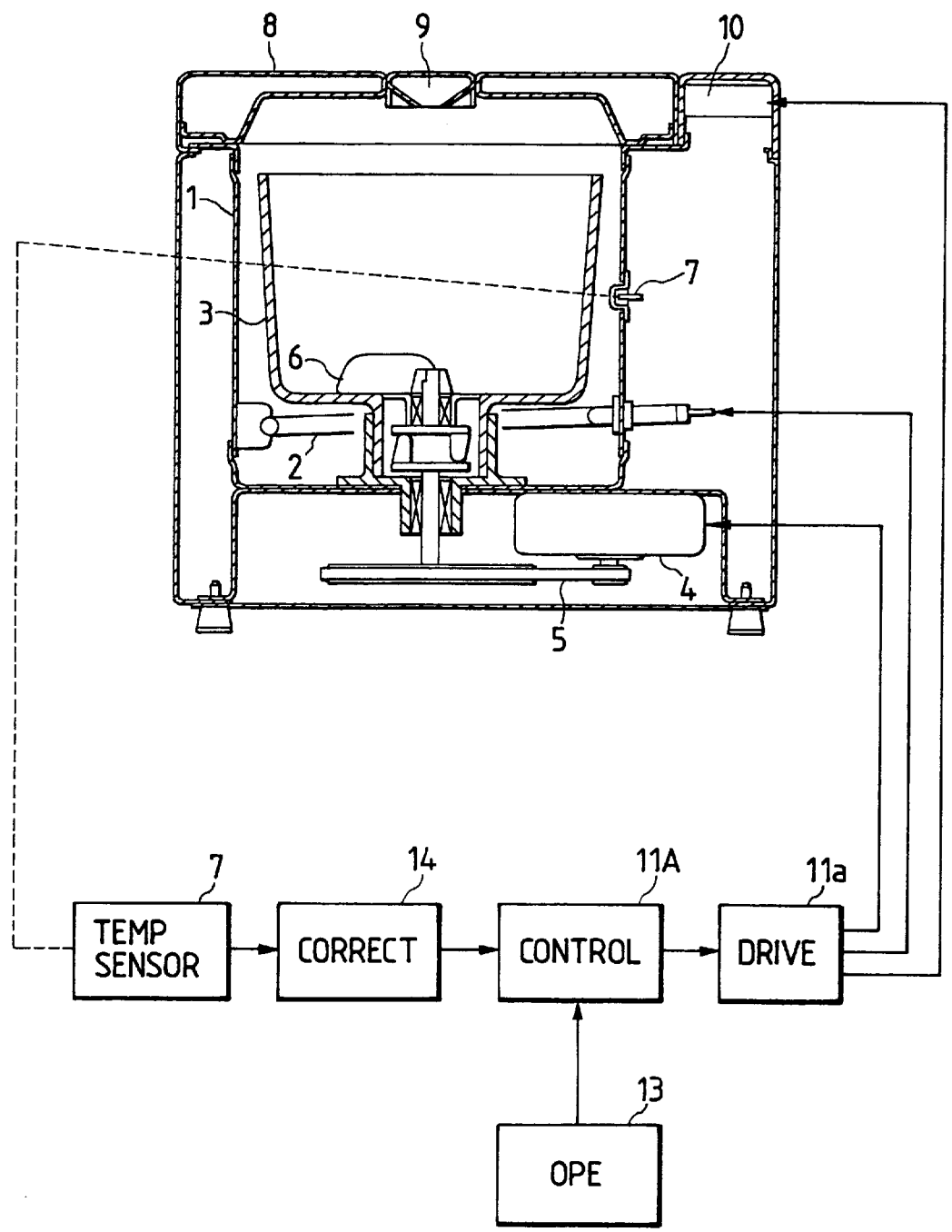
FIG. 6 is a diagram of an automatic bread producing apparatus according to a first embodiment of this invention.

With reference to FIG. 6, an automatic bread producing apparatus which has a baking chamber 1 in which a heater 2 is disposed. A bread vessel 3 is detachably mounted within the baking chamber 1. A motor 4 located outside the baking chamber 1 is coupled via a belt 5 to rotatable mixing vanes (rotatable kneading blades) 6 to drive the mixing vanes 6. The mixing vanes 6 extend in a bottom region of the baking chamber 1.

A sensor 7 detects a temperature within the baking chamber 1. A movable lid 8 selectively opens and closes an upper end of the baking chamber 1. The lid 8 has an opening 9 for feeding yeast into the bread vessel 3. A valve selectively blocking and unblocking the yeast feed opening 9 is driven by a solenoid or an electromagnetic actuator 10.

The temperature sensor 7 is followed by a corrector 14. The corrector 14 receives the output signal of the temperature sensor 7 which represents the detected temperature within the baking chamber 1. The corrector 14 changes or corrects the output signal of the temperature sensor 7 into a signal representing a correction-resultant temperature within the bread vessel 3. The corrector 14 informs a controller 11A of the bread-vessel temperature signal.

The corrector 14 and the controller 11A include a common microcomputer or a similar device having a combination of an I/O port, a CPU, a ROM, and a RAM. The corrector 14 and the controller 11A operate in accordance with a program stored in the ROM.

As previously described, the controller 11A is informed by the corrector 14 of the correction-resultant temperature within the bread vessel 3. An operation device 13 electrically connected to the controller 11A has manual switches or manual keys operated by a user. The controller 11A is informed by the operation device 13 of various commands including a bread-production start command. A drive circuit 11a is electrically connected between the controller 11A and the actuators 2, 4, and 10. The drive circuit 11a serves as an interface between the controller 11A and the actuators 2, 4, and 10. The controller 11A generates signals or Information pieces for control of the actuators 2, 4, and 10 in response to the temperature information and the start command. The controller 11A outputs the generated control signals (the control information pieces) to the drive circuit 11a. Then, the control information pieces (the control signals) are transmitted to the actuators 2, 4, and 10 via the drive circuit 11a. The actuators 2, 4, and 10 are controlled in response to the control signals (the control information pieces). In this way, the controller 11A controls the actuators 2, 4, and 10 in response to the temperature information and the start command. The control of the actuators 2, 4, and 10 is determined by the previously-indicated program.

The corrector 14 is programmed to implement the following functions. Upon the occurrence of a bread-production start command which results from actuation of the operation device 13, the corrector 14 samples the output signal of the temperature sensor 7 and derives the detected temperature within the baking chamber 1 from the sample. In this case, the detected temperature within the baking chamber 1 is regarded room temperature. Here, the room temperature means a temperature within a room in which an apparatus body is located. The corrector 14 determines corrective values for respective basic desired control temperatures in response to the derived temperature information (that is, the detected temperature within the baking chamber 1 or the room temperature). The basic desired control temperatures are preset in connection with bread producing steps. The corrector 14 informs the controller 11A of the determined corrective values. The controller 11A is programmed to implement the following functions. The controller 11A corrects the basic desired control temperatures into final desired control temperatures in response to the corrective values respectively. For example, the final desired control temperatures are generated by adding the corrective values to the basic desired control temperatures. The controller 11A controls bread production in response to the final desired control temperatures.

Experiments were performed. A reference apparatus was made by removing the corrector 14 from the apparatus of FIG. 6. In the reference apparatus, the temperature sensor 7 and the controller 11A were directly coupled to each other, and another temperature sensor (a second temperature sensor) was disposed in the bread vessel 3. Typical baking steps were executed by the reference apparatus at different room temperatures. During the execution of the typical baking steps, measurements were given of the temperature represented by the output signal the temperature sensor 7 and also the temperature represented by the output signal of the second temperature sensor. The temperature represented by the output signal of the second temperature sensor was equal to the temperature within the bread vessel 3.

Figure 7:
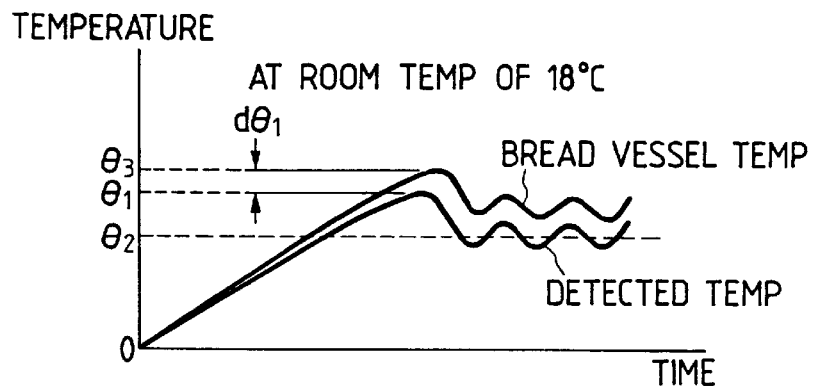
FIG. 7 is a time-domain diagram of a temperature within a bread vessel and a temperature detected by a temperature sensor which occur at a room temperature of 18° C.

FIG. 7 shows the results of the measurements which occurred during the execution of the typical baking step at a room temperature of 18° C. With reference to FIG. 7, both the temperature detected by the temperature sensor 7 and the temperature within the bread vessel 3 increased as time went by from the moment of start of the typical baking step. The temperature detected by the temperature sensor 7 continued to increase until it reached a peak temperature determined by a first control temperature $\theta 1$. After the temperature detected by the temperature sensor 7 reached the peak temperature (the first control temperature $\theta 1$), it was maintained around a second control temperature $\theta 2$. The temperature within the bread vessel 3 was equal to a value $\theta 3$ when the temperature detected by the temperature sensor 7 reached the peak temperature (the first control temperature $\theta 1$). The bread-vessel temperature $\theta 3$ was higher than the detected temperature $\theta 1$ by a value $d\theta 1$. Here, $d\theta 1 = \theta 3 - \theta 1$. After the temperature within the bread vessel 3 reached the value $\theta 3$, it periodically changed in accordance with fluctuations in the temperature detected by the temperature sensor 7 while remaining higher than the detected temperature by a value approximately equal to the value $d\theta 1$.

Figure 8:
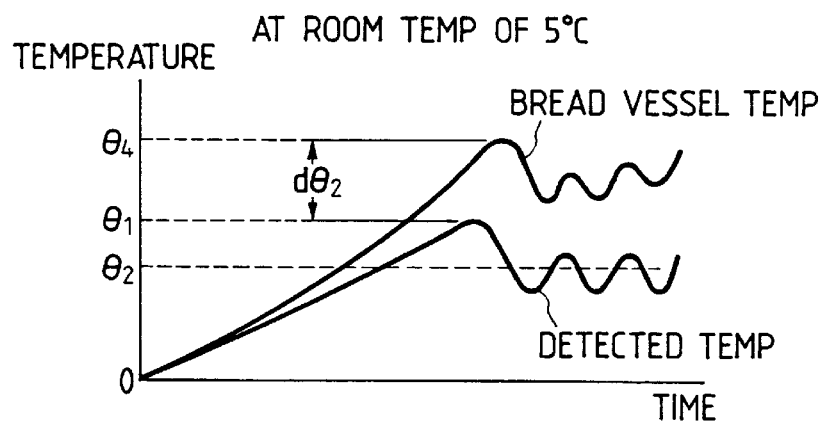
FIG. 8 is a time-domain diagram of the temperature within the bread vessel and the temperature detected by the temperature sensor which occur at a room temperature of 5° C.

FIG. 8 shows the results of the measurements which occurred during the execution of the typical baking step at a room temperature of 5° C. With reference to FIG. 8, both the temperature detected by the temperature sensor 7 and the temperature within the bread vessel 3 increased as time went by from the moment of start of the typical baking step. The temperature detected by the temperature sensor 7 continued to increase until it reached a peak temperature determined by the first control temperature $\theta 1$. After the temperature detected by the temperature sensor 7 reached the peak temperature (the first control temperature $\theta 1$), it was maintained around the second control temperature $\theta 2$. The temperature within the bread vessel 3 was equal to a value $\theta 4$ when the temperature detected by the temperature sensor 7 reached the peak temperature (the first control temperature $\theta 1$). The bread-vessel temperature $\theta 4$ was higher than the detected temperature $\theta 1$ by a value $d\theta 2$. Here, $d\theta 2 = \theta 4 - \theta 1$. The difference $d\theta 2$ was considerably greater than the difference $d\theta 1$. The difference $d\theta 2$ was equal to about 20° C. After the temperature within the bread vessel 3 reached the value $\theta 4$, it periodically changed in accordance with fluctuations in the temperature detected by the temperature sensor 7 while remaining higher than the detected temperature by a value slightly greater than the value $d\theta 2$.

Figure 9:
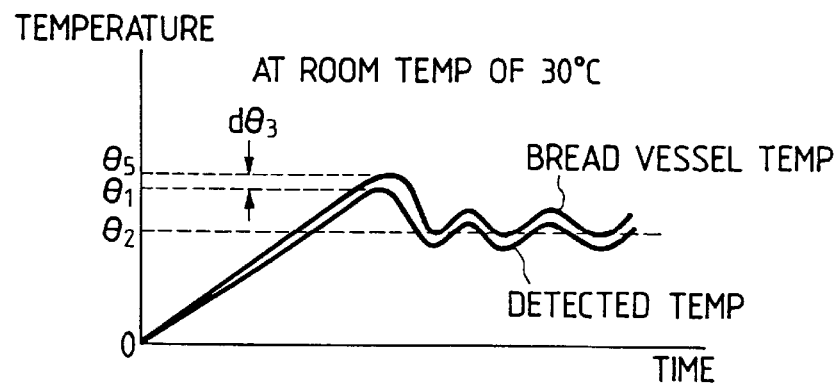
FIG. 9 is a time-domain diagram of the temperature within the bread vessel and the temperature detected by the temperature sensor which occur at a room temperature of 30° C.

FIG. 9 shows the results of the measurements which occurred during the execution of the typical baking step at a room temperature of 30° C. With reference to FIG. 9, both the temperature detected by the temperature sensor 7 and the temperature within the bread vessel 3 increased as time went by from the moment of start of the typical baking step. The temperature detected by the temperature sensor 7 continued to increase until it reached a peak temperature determined by the first control temperature θ1. After the temperature detected by the temperature sensor 7 reached the peak temperature (the first control temperature θ1), it was maintained around the second control temperature θ2. The temperature within the bread vessel 3 was equal to a value θ5 when the temperature detected by the temperature sensor 7 reached the peak temperature (the first control temperature θ1). The bread-vessel temperature θ5 was higher than the detected temperature θ1 by only a small value dθ3.

Here, dθ3=θ5−θ1. The difference dθ3 was smaller than the difference dθ1, and was negligible. After the temperature within the bread vessel 3 reached the value θ5, it periodically changed in accordance with fluctuations in the temperature detected by the temperature sensor 7 while remaining higher than the detected temperature by only a small value approximately equal to the value dθ3.

According to the results of the experiments, the difference between the temperature within the bread vessel 3 and the temperature detected by the temperature sensor 7 increased as the room temperature dropped. This fact resulted for the following reasons. Heating control via the heater 2 was executed in response to the temperature detected by the temperature sensor 7. Specifically, the heater 2 was controlled so that the temperature detected by the temperature sensor 7 could be equal to the first control temperature θ1 or the second control temperature θ2. The temperature sensor 7 detected the temperature within the baking chamber 1 rather than the temperature within the bread vessel 3. The outer surfaces of the walls defining the baking chamber 1 were exposed to atmosphere, and the temperature within the baking chamber 1 depended on the atmospheric temperature (the room temperature). Accordingly, at a low room temperature, the heater 2 was more activated and hence the temperature within the bread vessel 3 was higher relative to the temperature within the baking chamber 1.

Corrective values dθ for basic desired control temperatures were determined at different room temperatures through experiments. The corrective values dθ were designed to compensate for the previously-indicated differences between the temperature within the baking chamber 1 (that is, the temperature detected by the temperature sensor 7) and the temperature within the bread vessel 3. Data of the corrective values dθ in relation to different room temperatures were stored into the ROM within the corrector 14.

FIG. 10 shows an example of corrective values dθ which vary as functions of a room temperature. With reference to FIG. 10, corrective values dθ are equal to 0 for a high-temperature process and an intermediate-temperature process. A low-temperature process is of four different types. The low-temperature process of the first type corresponds to a room temperature between 22° C. and 26° C. The low-temperature process of the second type corresponds to a room temperature between 15° C. and 22° C. The low-temperature process of the third type corresponds to a room temperature between 7.5° C. and 15° C. The low-temperature process of the fourth type corresponds to a room temperature below 7.5° C. As shown in FIG. 10, the corrective values dθ are equal to 0 for the low-temperature process of the first type. Non-zero corrective values dθ are set for the low-temperature process of the second type, the third type, and the fourth type. In this case, the non-zero corrective values dθ depend on the type of the low-temperature process.

Figure 11:
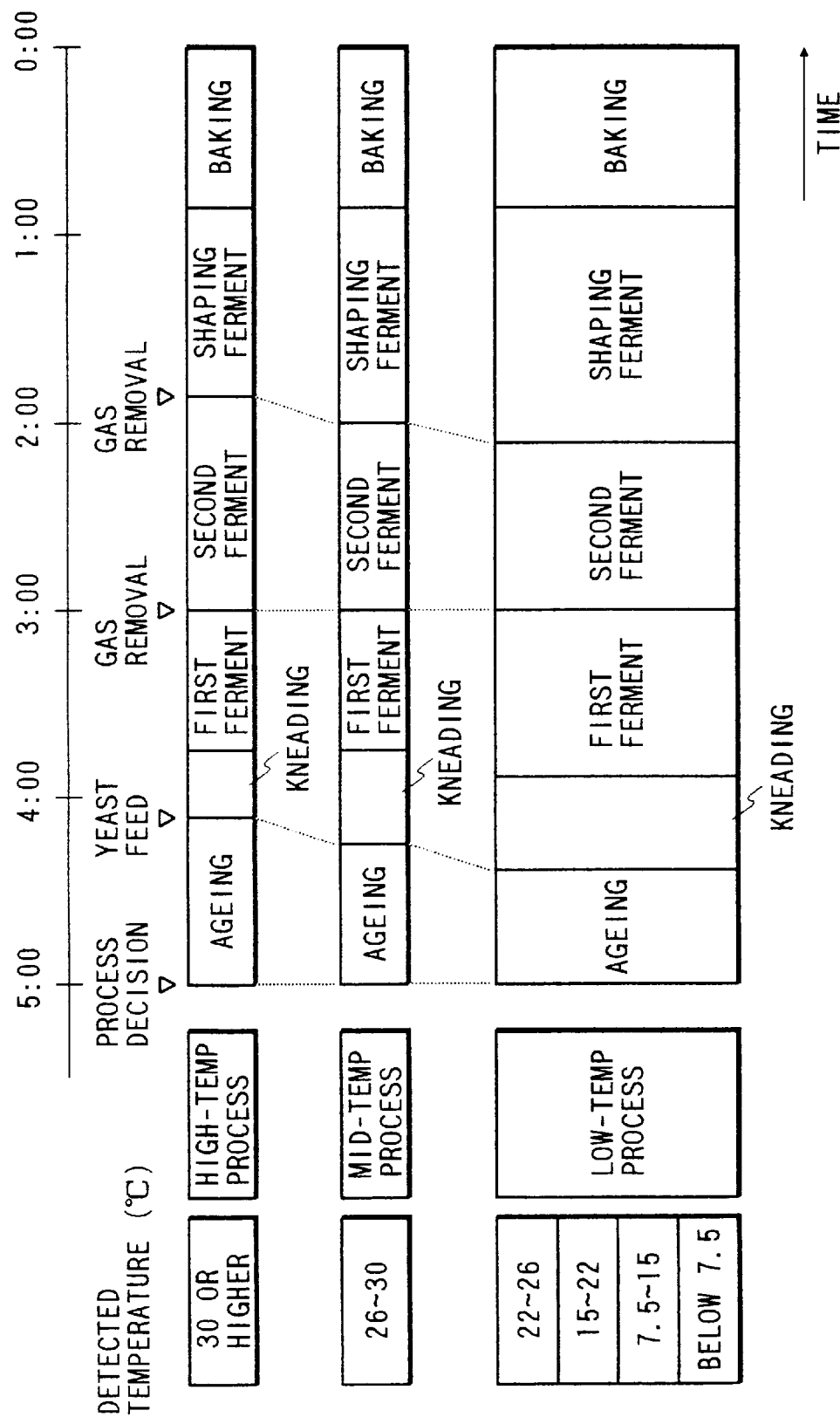
FIG. 11 is a time-domain diagram of sequences of steps in bread producing processes executed by the apparatus of FIG. 6.

FIG. 11 shows different sequences of bread producing steps executed by the apparatus of FIG. 6. In FIG. 11, there is a high-temperature process, an intermediate-temperature process, and a low-temperature process related to the respective sequences of bread producing steps. Here, the high-temperature process, the intermediate-temperature process, and the low-temperature process mean processes suited for a high room temperature, an intermediate room temperature, and a low room temperature respectively. The controller 11A and the corrector 14 are programmed to implement the following functions. The controller 11A selects one of the high-temperature process, the intermediate-temperature process, and the low-temperature process in response to the detected temperature within the baking chamber 1 which occurs immediately after the start of bread production. In this case, the detected temperature within the baking chamber 1 is regarded as a room temperature. Specifically, the high-temperature process is selected when the detected temperature (the room temperature) is equal to or higher than 30° C. The low-temperature process is selected when the detected temperature (the room temperature) is lower than 26° C. The intermediate-temperature process is selected when the detected temperature (the room temperature) is between 26° C. and 30° C. Then, the sequence of bread producing steps which corresponds to the selected process is executed by the controller 11A according to step-time and temperature controlling conditions. When the high-temperature process or the intermediate-temperature process is selected, the corrector 14 selects corrective values of "0" as shown in FIG. 10 and informs the controller 11A of the "0" corrective values. Accordingly, in this case, the controller 11A does not correct basic desired control temperatures, and uses the basic desired control temperatures as final desired control temperatures. Thus, the controller 11A controls bread production in response to the basic desired control temperatures. When the low-temperature process of the first type is selected, the corrector 14 selects corrective values of "0" as shown in FIG. 10 and informs the controller 11A of the "0" corrective values. Accordingly, in this case, the controller 11A does not correct basic desired control temperatures, and uses the basic desired control temperatures as final desired control temperatures. Thus, the controller 11A controls bread production in response to the basic desired control temperatures. When the low-temperature process of the second type, the third type, or the fourth type is selected, the corrector 14 selects non-zero corrective values as shown in FIG. 10 and informs the controller 11A of the non-zero corrective values. Accordingly, in this case, the controller 11A corrects the basic desired control temperatures into final desired control temperatures in response to the non-zero corrective values. For example, the final desired control temperatures are generated by adding the non-zero corrective values to the basic desired control temperatures. Thus, the controller 11A controls bread production in response to the correction-resultant control temperatures (the final desired control temperatures).

Second Embodiment

Figure 12:
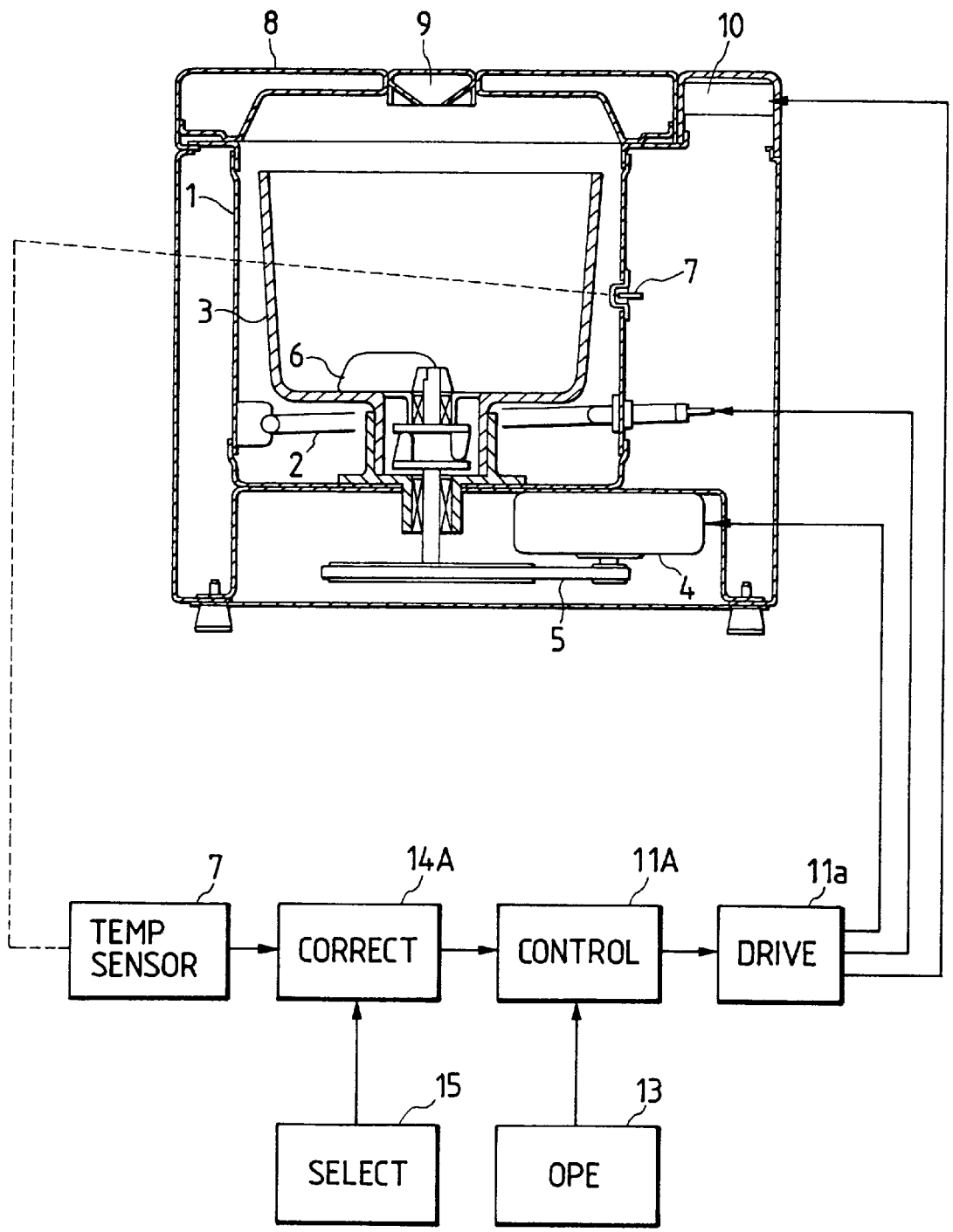
FIG. 12 is a diagram of an automatic bread producing apparatus according to a second embodiment of this invention.

FIG. 12 shows a second embodiment of this invention which is similar to the embodiment of FIG. 6 except that a corrector 14A replaces the corrector 14 of FIG. 6, and that a selector 15 connected to the corrector 14A is additionally provided. In the embodiment of FIG. 12, the selector 15 includes a constant voltage source, and voltage dividing resistors for generating different reference voltages from a voltage of the constant voltage source. The reference voltages are in the range of, for example. 0 V to 5 V. The selector 15 also includes a switch for selecting one of the different reference voltages, and feeds the selected reference voltage to an A/D conversion input terminal of a microcomputer forming the corrector 14A. The corrector 14A is programmed to change corrective values in response to the reference voltage fed from the selector 15. The corrector 14A informs a controller 11A of the change-resultant corrective values. For example, when the reference voltage fed from the selector 15 is equal to 1 V, the corrector 14A adds 0.1 to original corrective values to generate the change-resultant corrective values. In this way, actually used corrective values can be modified in response to an externally applied instruction.

Third Embodiment

Figure 13:
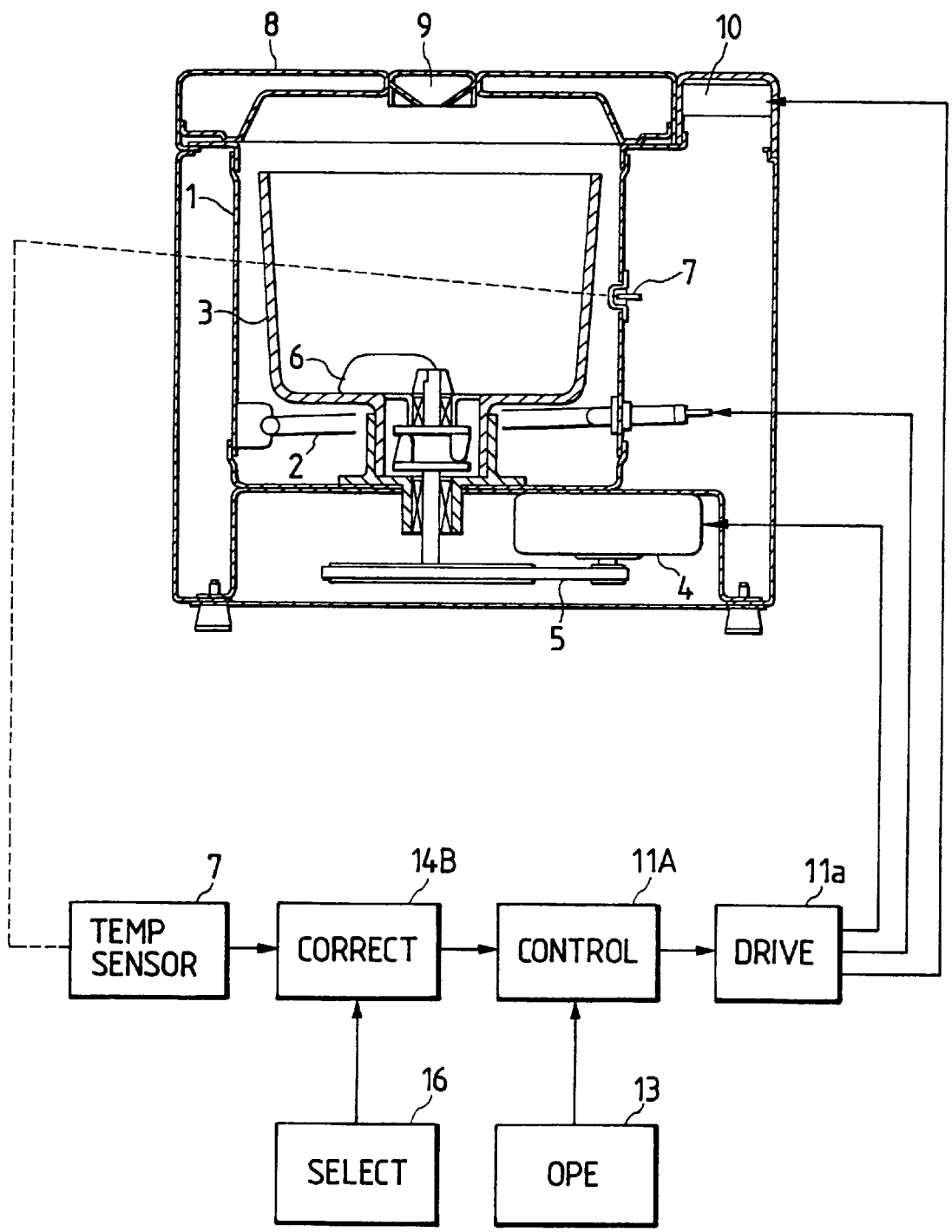
FIG. 13 is a diagram of an automatic bread producing apparatus according to a third embodiment of this invention.

FIG. 13 shows a third embodiment of this invention which is similar to the embodiment of FIG. 6 except that a corrector 14B replaces the corrector 14 of FIG. 6, and that a selector 16 connected to the corrector 14B is additionally provided.

In the embodiment of FIG. 13, the corrector 14B is programmed to implement the following functions. Upon the occurrence of a bread-production start command which results from actuation of an operation device 13, the corrector 14B samples the output signal of a temperature sensor 7 and derives the detected temperature within a baking chamber 1 from the sample. In this case, the detected temperature within the baking chamber 1 is regarded as a room temperature. The corrector 14B determines corrective values for respective basic desired control temperatures in response to the derived temperature information (that is, the detected temperature within the baking chamber 1 or the room temperature) by referring to given corrective equations. The basic desired control temperatures are preset in connection with bread producing steps. The corrector 14B informs a controller 11A of the determined corrective values.

In the embodiment of FIG. 13, the selector 16 selects values of coefficients in the above-indicated corrective equations from among predetermined values in response to an externally applied instruction. The selector 16 includes a constant voltage source, and voltage dividing resistors for generating different reference voltages from a voltage of the constant voltage source. The reference voltages are in the range of, for example, 0 V to 5 V. The selector 16 also includes a switch for selecting one of the different reference voltages, and feeds the selected reference voltage to an A/D conversion input terminal of a microcomputer forming the corrector 14B. The corrector 14B is programmed to select values of coefficients in the above-indicated corrective equations from among predetermined values in response to the reference voltage fed from the selector 16. The corrector 14 determines corrective values in response to the temperature information (that is, the detected temperature within the baking chamber 1 or the room temperature) by referring to the given corrective equations. The corrector 14A informs the controller 11A of the determined corrective values. In this way, actually used corrective values can be modified in response to an externally applied instruction.

Figures 14, 15:
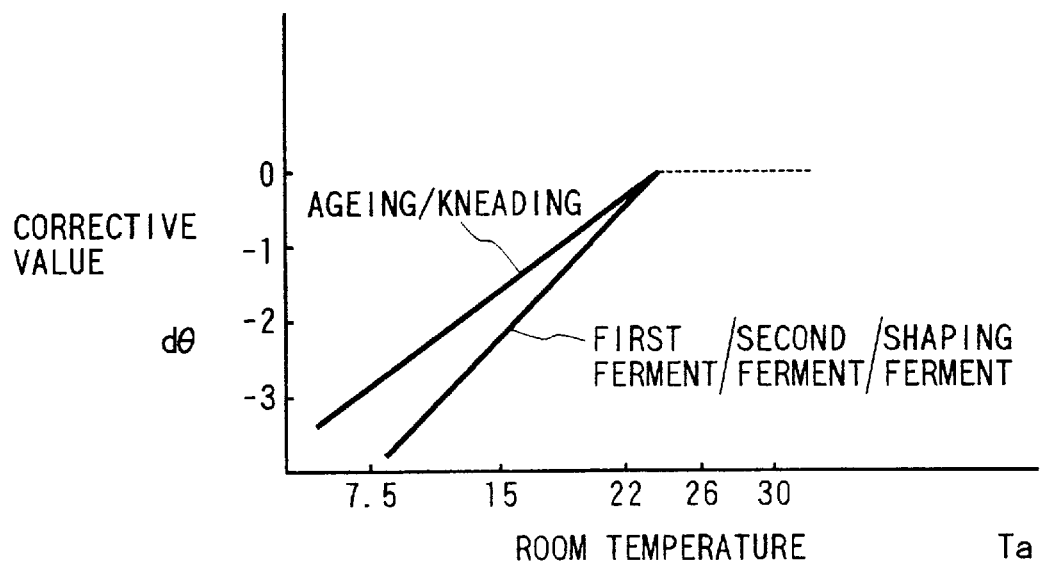
FIG. 14 is a diagram of the relation between a corrective value and a room temperature in the apparatus of FIG. 13.
FIG. 15 is a diagram of predetermined values for coefficients "A" and "B" in a corrective equation.

FIG. 14 shows an example of the relation between a corrective value dθ and a room temperature Ta for a kneading step and an aging step (a resting step), and an example of the relation between a corrective value dθ and a room temperature Ta for a first fermenting step, a second fermenting step, and a shaping and fermenting step. These relations are provided by the previously-indicated corrective equations.

FIG. 15 shows an example of pairs of predetermined values for coefficients "A" and "B" in one of the previously-indicated corrective equations. For example, the relation between a corrective value dθ and a room temperature Ta for the aging step (the resting step) is given by the corrective equation as "dθ=A·α·Ta+β+B" where "α" and "β" denote predetermined constants. A pair of values of the coefficients "A" and "B" in the equation is selected from among the predetermined values in response to the reference voltage fed from the selector 16. Then, the corrective value dθ for the aging step (the resting step) is determined or calculated on the basis of the room temperature Ta by referring to the corrective equation.

It should be noted that different corrective equations may be given for the kneading step, the aging step (the resting step), the first fermenting step, the second fermenting step, and the shaping and fermenting step respectively.

Fourth Embodiment

Figure 16:
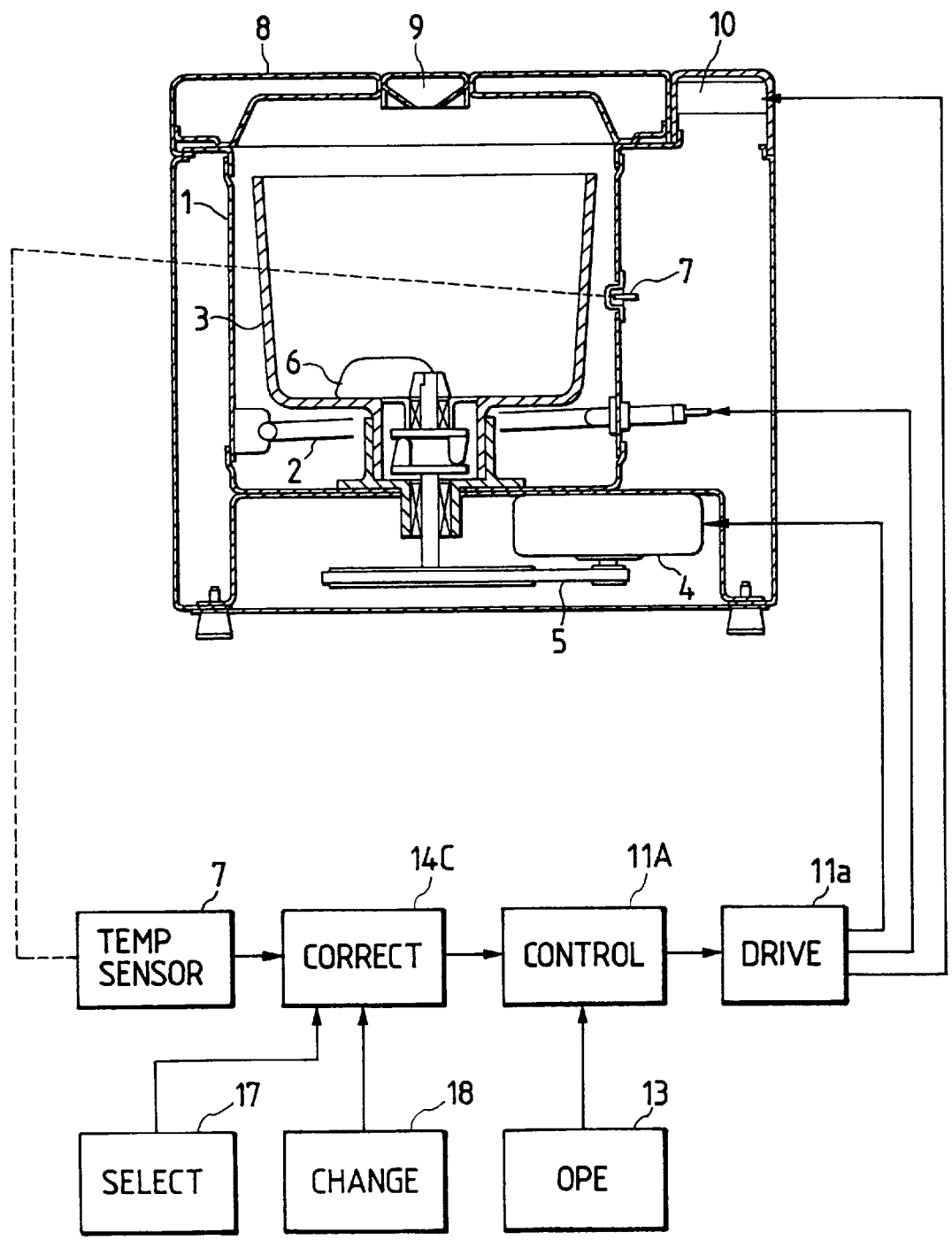
FIG. 16 is a diagram of an automatic bread producing apparatus according to a fourth embodiment of this invention.

FIG. 16 shows a fourth embodiment of this invention which is similar to the embodiment of FIG. 6 except that a corrector 14C replaces the corrector 14 of FIG. 6, and that a selector 17 and a changer 18 connected to the corrector 14C are additionally provided.

In the embodiment of FIG. 16, the selector 17 includes a constant voltage source, and voltage dividing resistors for generating different reference voltages from a voltage of the constant voltage source. The reference voltages are in the range of, for example, 0 V to 5 V. The selector 17 also includes a switch for selecting one of the different reference voltages, and feeds the selected reference voltage to an A/D conversion input terminal of a microcomputer forming the corrector 14C. The reference voltages correspond to selection code words of "1", "2", "3", "4", "5", "6", "7", and "8" respectively. As shown in FIG. 17, selection code words of "1", "2", "3", "4", "5", "6", "7", and "8" are assigned to an aging step (a resting step), a kneading step, a first fermenting step, a second fermenting step, a shaping and fermenting step, a baking and temperature peaking step, a baking and temperature controlling step, and a reserved word respectively.

In the embodiment of FIG. 16, the changer 18 includes a constant voltage source, and voltage dividing resistors for generating different reference voltages from a voltage of the constant voltage source. The reference voltages are in the range of, for example, 0 V to 5 V. The changer 17 also includes a switch for selecting one of the different reference voltages, and feeds the selected reference voltage to an A/D conversion input terminal of the microcomputer forming the corrector 14C. The reference voltages correspond to shift code words of "1", "2", "3", "4", "5", "6", "7", and "8" respectively. As shown in FIG. 18, shift code words of "1", "2", "3", "4", "5", "6", "7", and "8" are assigned to a corrective value shift of −1.5° C., a corrective value shift of −1° C., a corrective value shift of −0.5° C., a corrective value shift of 0° C., a corrective value shift of +0.5° C., a corrective value shift of +1° C., a corrective value shift of +1.5° C., and a corrective value shift of +2° C. respectively.

The corrector 14C is programmed to change corrective values in response to the reference voltage fed from the selector 17 and the reference voltage fed from the changer 18. Specifically, the corrector 14C changes the corrective values for a bread producing step denoted by the information fed from the selector 17. The corrective values are changed or shifted by amounts denoted by the information fed from the changer 18. The corrector 14C informs a controller 11A of the change-resultant corrective values. In this way, actually used corrective values can be modified in response to an externally applied instruction for each of the bread producing steps.

Fifth Embodiment

Figure 19:
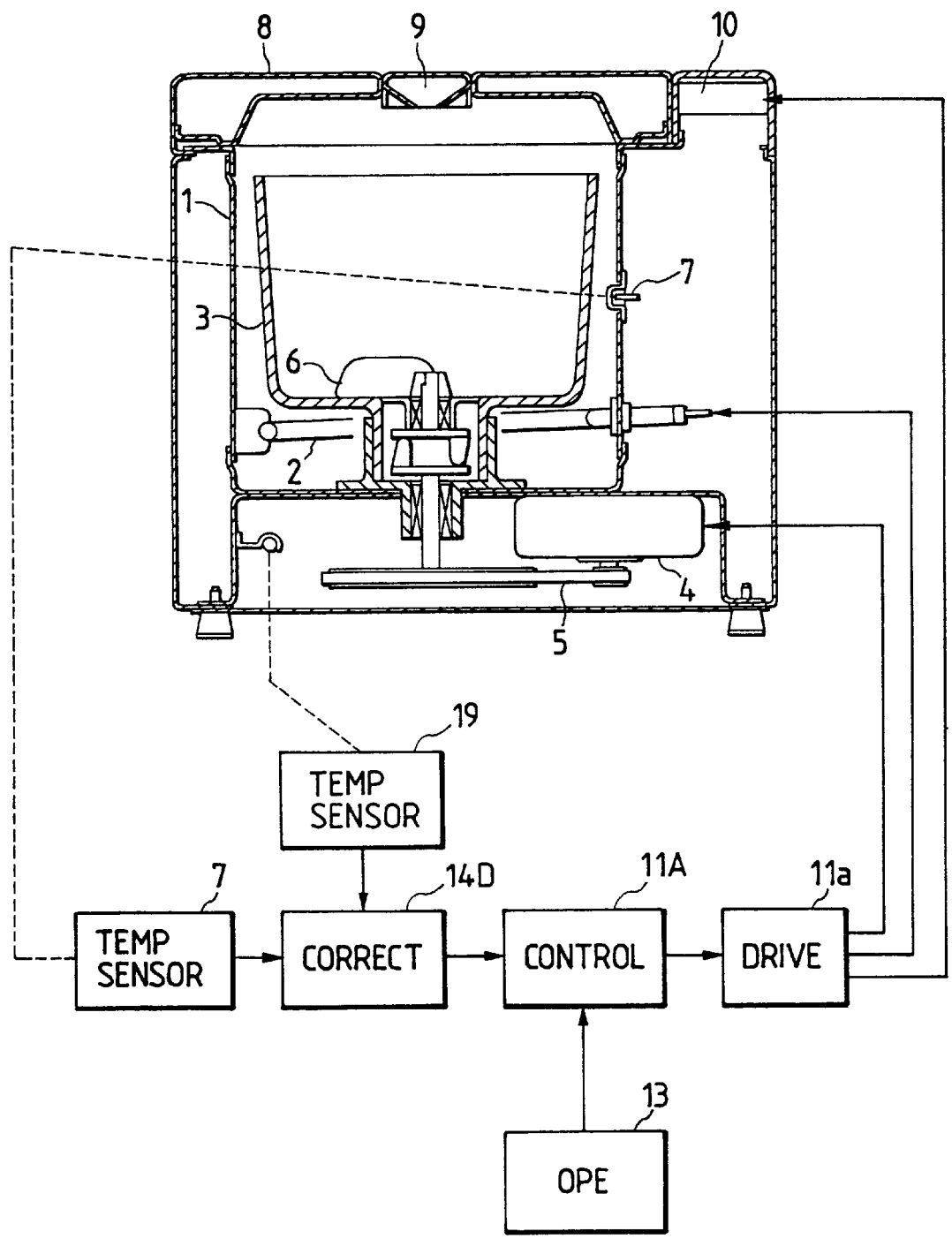
FIG. 19 is a diagram of an automatic bread producing apparatus according to a fifth embodiment of this invention.

FIG. 19 shows a fifth embodiment of this invention which is similar to the embodiment of FIG. 6 except that a corrector 14D replaces the corrector 14 of FIG. 6, and that a second temperature sensor 19 electrically connected to the corrector 14D is additionally provided.

In the embodiment of FIG. 19, the second temperature sensor 19 is mounted on apparatus walls separate from a baking chamber 1. The second temperature sensor 19 detects a room temperature without being adversely affected by operation of a heater 2. The second temperature sensor 19 informs the corrector 14D of the detected room temperature.

In the embodiment of FIG. 19, the corrector 14D is programmed to implement the following functions. Upon the occurrence of a bread-production start command which results from actuation of an operation device 13, the corrector 14D samples the output signal of a first temperature sensor 7 and derives the detected temperature within the baking chamber 1 from the sample. In this case, the detected temperature within the baking chamber 1 is regarded as a room temperature. The corrector 14D determines corrective values for an aging step (a resting step) in response to the derived temperature information (that is, the detected temperature within the baking chamber 1 or the room temperature). The corrector 14D informs a controller 11A of the determined corrective values for the aging step (the resting step). Upon the start of each of later steps from a kneading step to a baking step, the corrector 14D samples the output signal of the second temperature sensor 19 and derives the room temperature from the sample. The corrector 14D determines corrective values for the later steps in response to the derived room temperature. The corrector 14D informs the controller 11A of the determined corrective values for the later steps.

It should be noted that the corrector 14D may determine the corrective values for the aging step (the resting step) in response to the room temperature derived from the output signal of the second temperature sensor 19. Further, information of the room temperature for the correction purposes may be always derived from the output signal of the second temperature sensor 19 rather than the output signal of the first temperature sensor 7.

Sixth Embodiment

Figure 20:
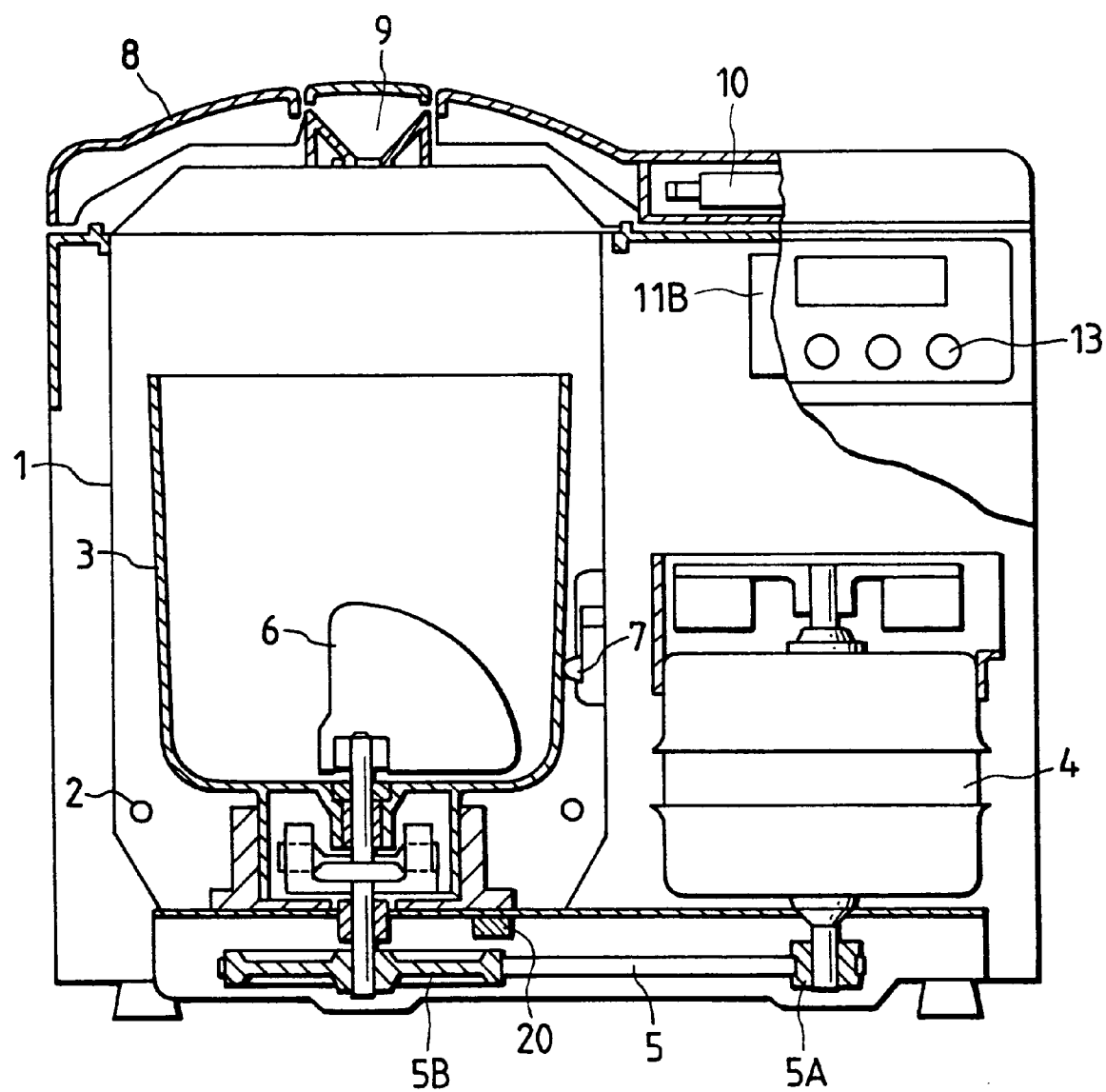
FIG. 20 is a diagram of an automatic bread producing apparatus according to a sixth embodiment of this invention.
Figure 21:
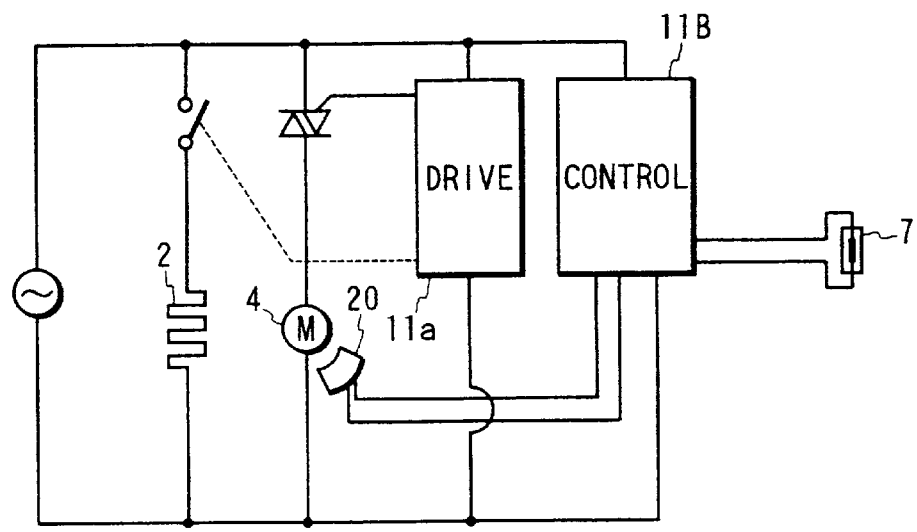
FIG. 21 is a diagram of an electric part of the apparatus of FIG. 20.

FIGS. 20 and 21 show a sixth embodiment of this invention which is similar to the embodiment of FIG. 6 except that a controller 11B replaces the controller 11A of FIG. 6 and a rotation sensor 20 is additionally provided, and that the corrector 14 (see FIG. 6) is omitted and the controller 11B and a temperature sensor 7 are directly connected to each other.

In the embodiment of FIGS. 20 and 21, a belt 5 extends between pulleys 5A and 5B. The pulley 5A is mounted on the output shaft of a motor 4. The pulley 5B is mounted on a shaft of mixing vanes (kneading blades) 6. The rotation sensor 20 is fixed to lower apparatus walls at a position directly above an edge of the pulley 5B. The rotation sensor 20 detects the rotational speed of the pulley 5B as an indication of the rotational speed of the mixing vanes 6. The rotation sensor 20 informs the controller 11B of the detected rotational speed of the mixing vanes 6.

Figure 22:
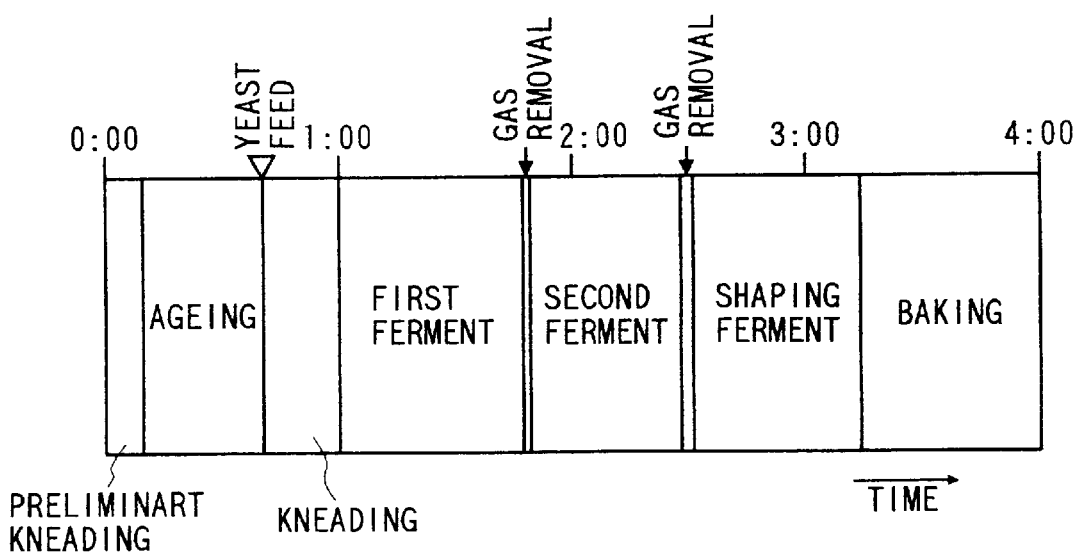
FIG. 22 is a time-domain diagram of a sequence of steps in a bread producing process executed by the apparatus of FIG. 20.

FIG. 22 shows a bread producing process executed by the embodiment of FIGS. 20 and 21. With reference to FIG. 22, after an aging step (a resting step) has been completed, a solenoid 10 is activated to unblock an opening 9 and yeast is fed into a bread vessel 3 via the opening 9. Then, a kneading step is started and the motor 4 is activated. Accordingly, the mixing vanes 6 are rotated by the motor 4.

During the kneading step, if dough (paste of bread) floats on the mixing vanes 6, the mixing vanes 6 race or idle and hence the rotational speed of the mixing vanes 6 remarkably increases. The controller 11B is programmed to detect such a remarkable increase in the rotational speed of the mixing vanes 6 by referring to the output signal of the rotation sensor 20. When such a remarkable speed increase is detected, the controller 11B temporarily deactivates the motor 4 via a drive circuit 11a for a given interval in the range of about 0.1 second to about 0.5 second. The deactivation of the motor 4 causes the dough (the paste of bread) to fall into regions between the mixing vanes 6. Then, the controller 11B activates the motor 4 again.

The pulley 5B has equally spaced radial slits. The rotation sensor 20 includes a photo-coupler which can sense the slits in the pulley 5B. During the rotation of the pulley 5B, the rotation sensor 20 outputs an electric pulse corresponding to every slit. Thus, the pulse frequency of the output signal of the rotation sensor 20 represents the rotational speed of the pulley 5B (the rotational speed of the mixing vanes 6).

Seventh Embodiment

Figure 23:
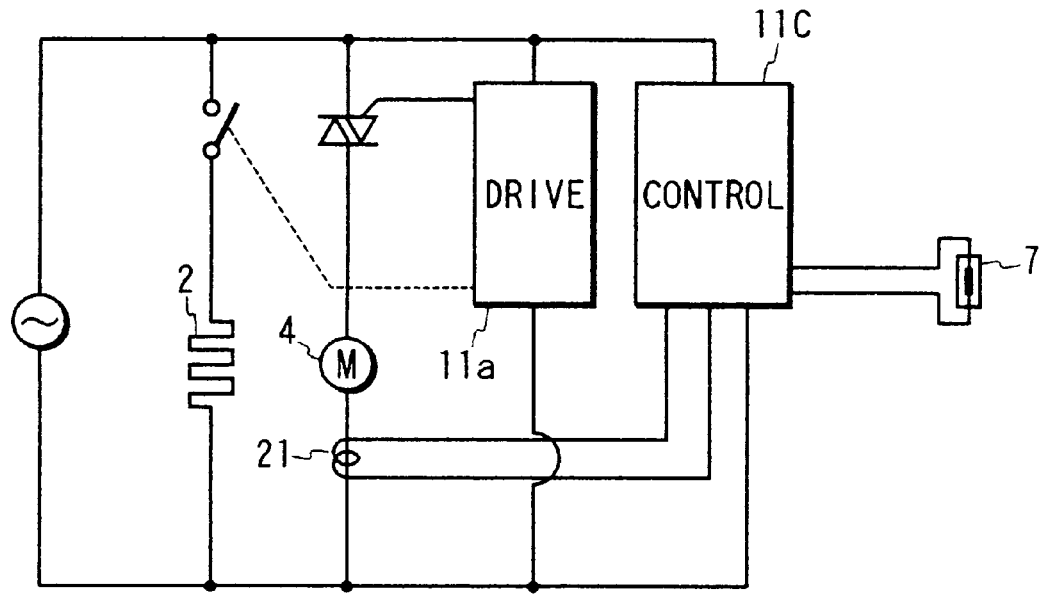
FIG. 23 is a diagram of an electric part of an automatic bread producing apparatus according to a seventh embodiment of this invention.

FIG. 23 shows a seventh embodiment of this invention which is similar to the embodiment of FIGS. 20 and 21 except that a current sensor 21 replaces the rotation sensor 20 of FIGS. 20 and 21, and that a controller 11C replaces the controller 11B of FIGS. 20 and 21.

In the embodiment of FIG. 23, the current sensor 20 detects the current which flows through a motor 4. The current sensor 21 informs the controller 11C of the detected motor current.

During a kneading step, if dough (paste of bread) floats on mixing vanes 6 (see FIG. 20), the mixing vanes 6 race or idle and hence the current of the motor 6 remarkably increases. The controller 11C is programmed to detect such a remarkable increase in the motor current by referring to the output signal of the current sensor 21. When such a remarkable current increase is detected, the controller 11C temporarily deactivates the motor 4 via a drive circuit 1 1a for a given interval in the range of about 0.1 second to about 0.5 second. The deactivation of the motor 4 causes the dough (the paste of bread) to fall into regions between the mixing vanes 6. Then, the controller 11C activates the motor 4 again.

Eighth Embodiment

Figure 24:
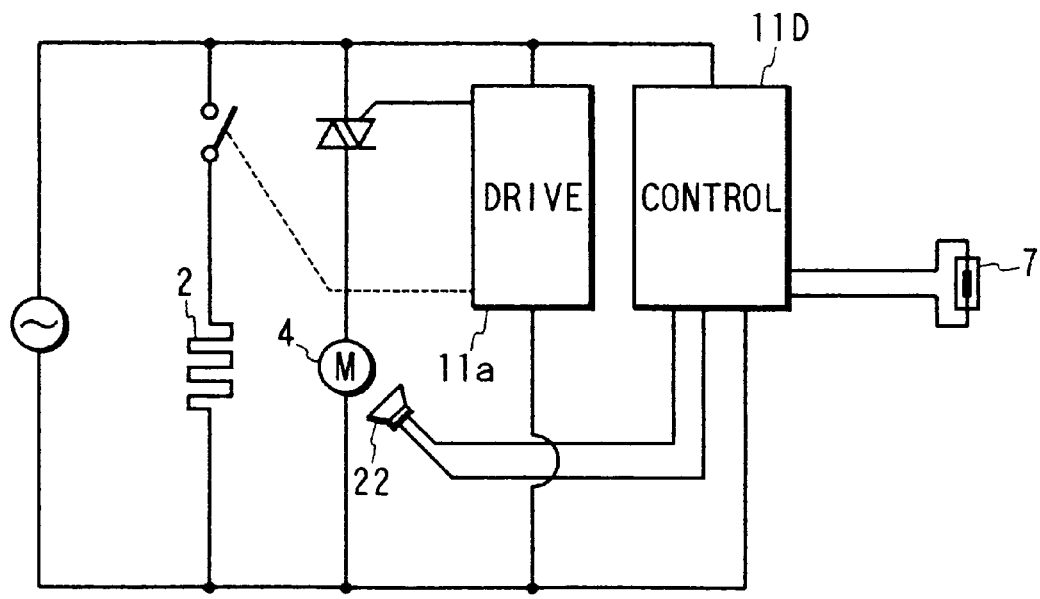
FIG. 24 is a diagram of an electric part of an automatic bread producing apparatus according to an eighth embodiment of this invention.

FIG. 24 shows an eighth embodiment of this invention which is similar to the embodiment of FIGS. 20 and 21 except that a sound sensor 22 replaces the rotation sensor 20 of FIGS. 20 and 21, and that a controller 11D replaces the controller 11B of FIGS. 20 and 21.

In the embodiment of FIG. 24, the sound sensor 20 detects sound generated by mixing vanes 6 (see FIG. 20). The sound sensor 20 informs the controller 11D of the detected sound.

During a kneading step, if dough (paste of bread) floats on mixing vanes 6 (see FIG. 20), the mixing vanes 6 race or idle and hence the intensity of sound generated by the mixing vanes 6 remarkably increases. The controller 11D is programmed to detect such a remarkable increase in the sound intensity by referring to the output signal of the sound sensor 22. When such a remarkable sound-intensity increase is detected, the controller 11D temporarily deactivates a motor 4 via a drive circuit 11a for a given interval in the range of about 0.1 second to about 0.5 second. The deactivation of the motor 4 causes the dough (the paste of bread) to fall into regions between the mixing vanes 6. Then, the controller 11D activates the motor 4 again.

Ninth Embodiment

Figure 25:
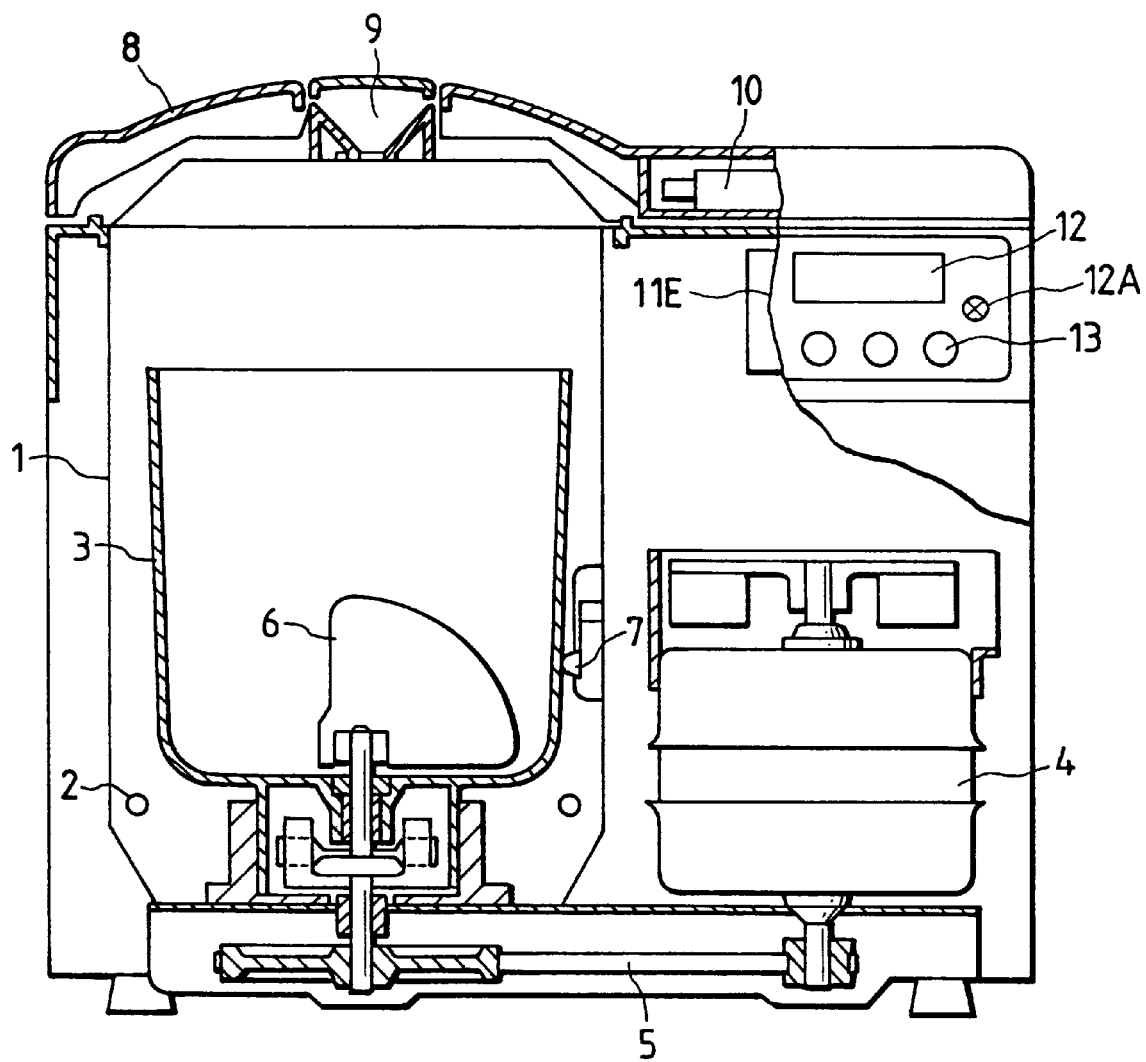
FIG. 25 is a diagram of an automatic bread producing apparatus according to a ninth embodiment of this invention.

FIG. 25 shows a ninth embodiment of this invention which is similar to the embodiment of FIGS. 20 and 21 except that a controller 11E replaces the controller 11B of FIGS. 20 and 21 and the rotation sensor 20 of FIGS. 20 and 21 is omitted, and that a display 12 and a sound generator 12A connected to the controller 11E are additionally provided.

Figure 26:
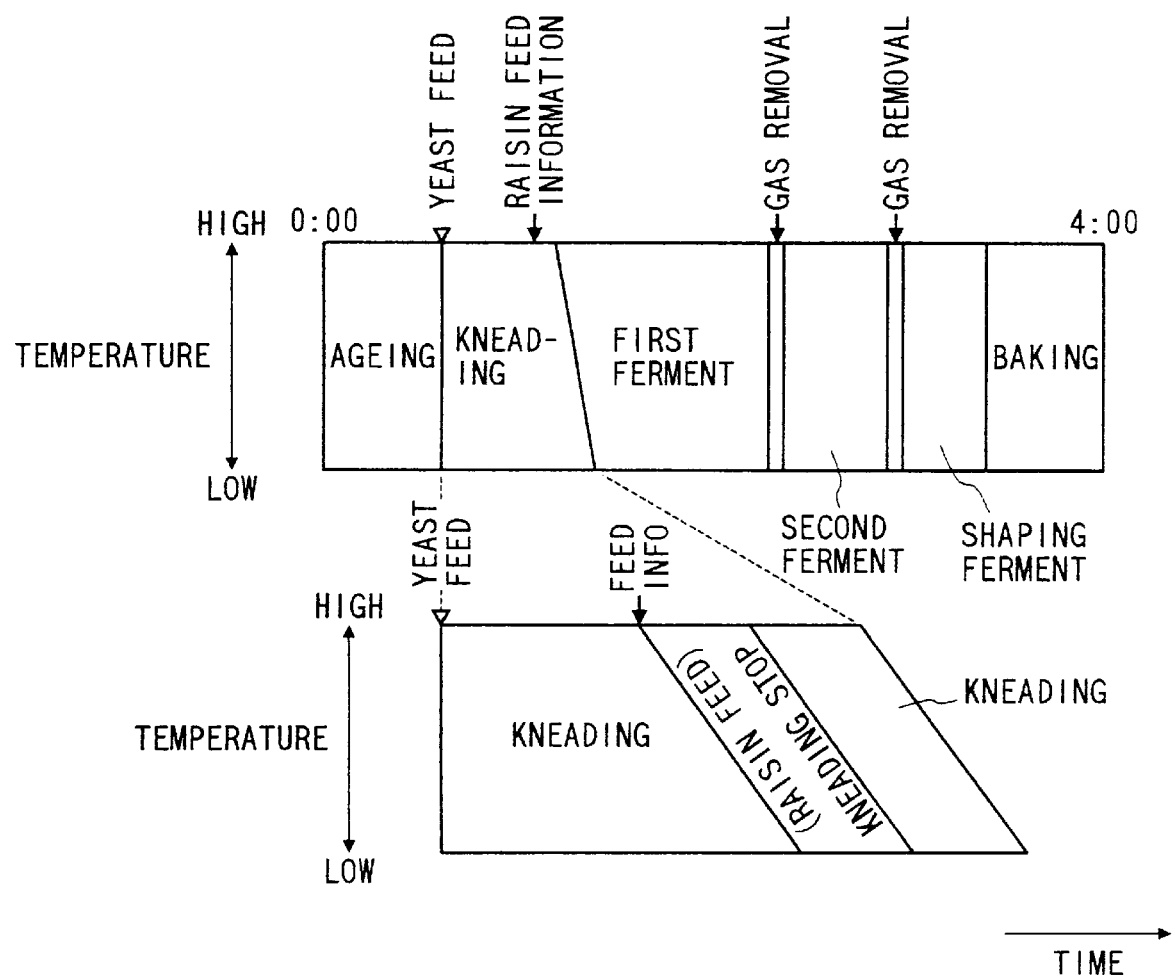
FIG. 26 is a time-domain diagram of a sequence of steps in a bread producing process executed by the apparatus of FIG. 25.

FIG. 26 shows a bread producing process executed by the embodiment of FIG. 25. With reference to FIG. 26, after an aging step (a resting step) has been completed, a solenoid 10 is activated to unblock an opening 9 and yeast is fed into a bread vessel 3 via the opening 9. Then, a kneading step is started and a motor 4 is activated.

The controller 11E is programmed to execute the following functions. During the kneading step, in the case where a time of 10 minutes or longer has elapsed since the start of the kneading step and a temperature detected by a temperature sensor 7 reaches a given temperature or higher, or in the case where a time of 20 minutes has elapsed since the start of the kneading step, the controller 11E deactivates the motor 4 via a drive circuit. Thus, in this case, the kneading step is suspended. In addition, the controller 11E activates the sound generator 12A and drives the display 12 to inform a user that raisins should be fed into a bread vessel 3. For example, the display 12 indicates "feed added food". This information urges the user to execute the feed of added food by actuating a lid 8. The controller 11E holds the kneading step suspended for 1 minute. Then, the controller 11E restarts the kneading step and continues the kneading step for a given constant time, for example, 3 minutes, independent of the temperature detected by the temperature sensor 7. As understood from the previous description, the time interval of the kneading step which occurs before the feed of added food varies between 10 minutes and 20 minutes in depending upon the temperature detected by the temperature sensor 7.

Subsequently, the kneading step is replaced by a first fermenting step. During the first fermenting step, the controller 11E activates a heater 2 via the drive circuit and executes temperature control. After the first fermenting step has been completed, the controller 11E activates the motor 4 via the drive circuit so that mixing vanes (kneading vanes) 6 rotate. The rotation of the mixing vanes 6 removes gas from dough (paste of bread). In this way, a gas removing step is executed. Then, the controller 11E sequentially executes a second fermenting step, a gas removing step, a shaping and fermenting step, and a baking step.

It should be noted that the time interval of the kneading step which occurs after the feed of added food may be variable in response to user's requirement.

Tenth Embodiment

Figure 27:
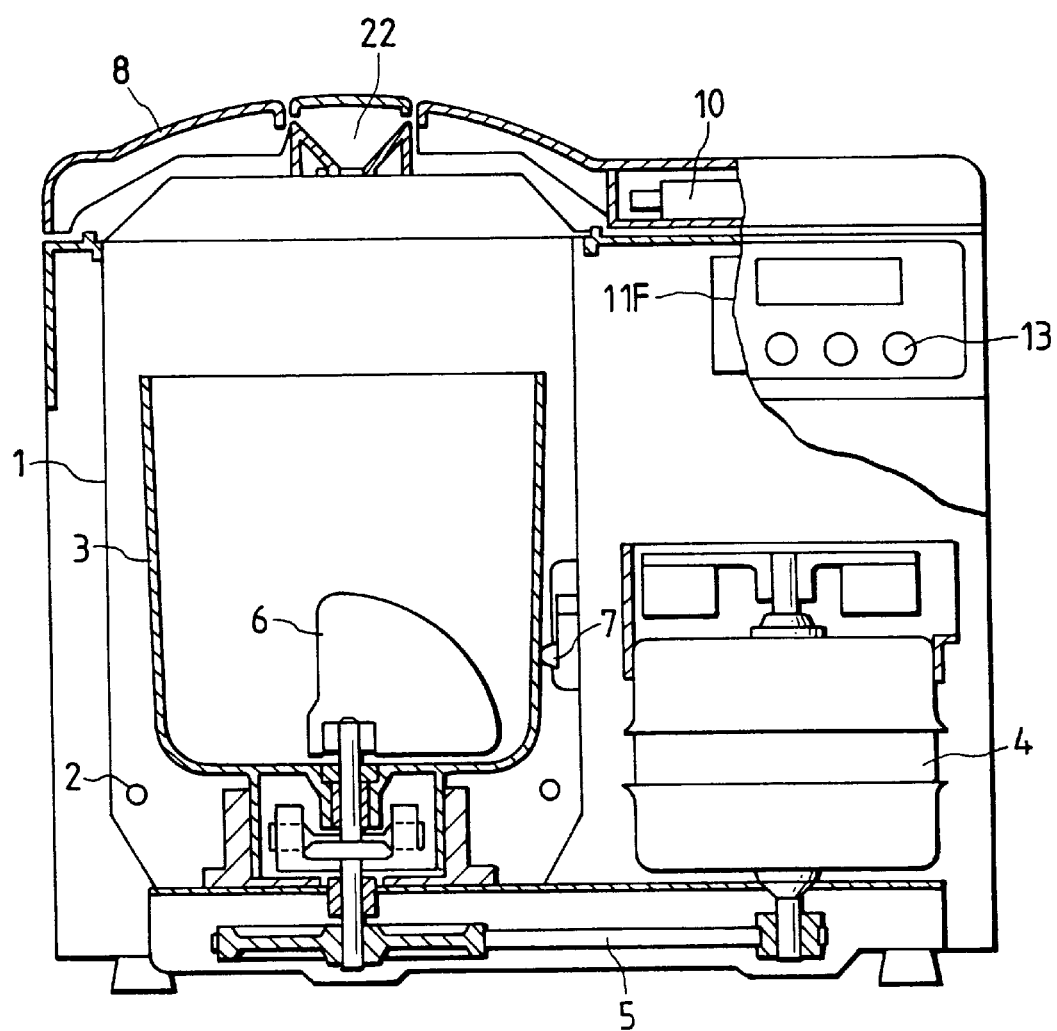
FIG. 27 is a diagram of an automatic bread producing apparatus according to a tenth embodiment of this invention.

FIG. 27 shows a tenth embodiment of this invention which is similar to the embodiment of FIGS. 20 and 21 except that a controller 11F replaces the controller 11B of FIGS. 20 and 21 and the rotation sensor 20 of FIGS. 20 and 21 is omitted, and that an added-food feeder 26 is provided on a lid 8. In the embodiment of FIG. 27, the added-food feeder 26 is driven by a solenoid or an electromagnetic actuator 10.

Figure 28:
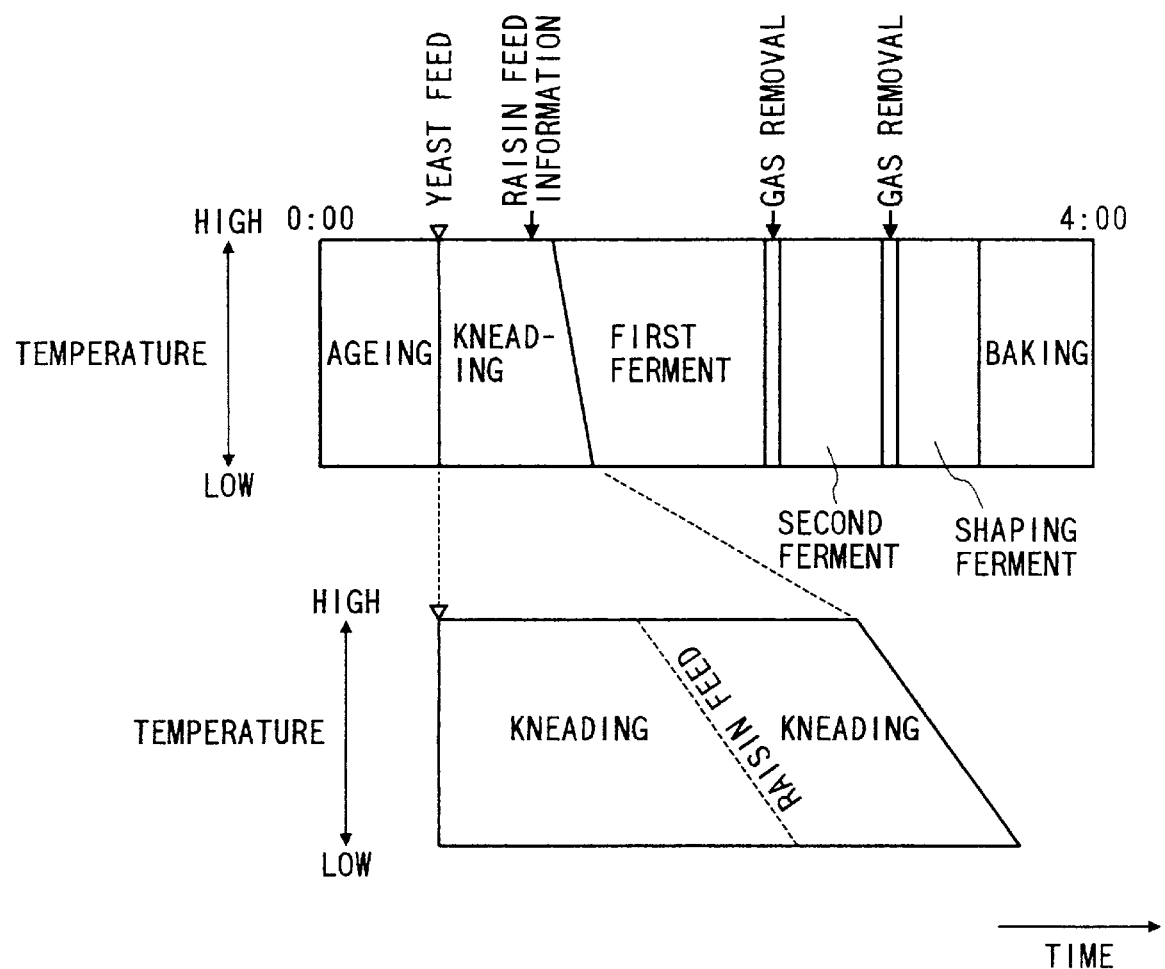
FIG. 28 is a time-domain diagram of a sequence of steps in a bread producing process executed by the apparatus of FIG. 27.

FIG. 28 shows a bread producing process executed by the embodiment of FIG. 27. The controller 11F is programmed to execute the following functions. With reference to FIG. 28, bread ingredients including flour with yeast are placed in a bread vessel or a bread baking mold 3, and then an aging step (a resting step) is started by the controller 11F. After the aging step has been completed, the controller 11F activates a motor 4 via a drive circuit and starts a kneading step.

During the kneading step, in the case where a time of 10 minutes or longer has elapsed since the start of the kneading step and a temperature detected by a temperature sensor 7 reaches 30° C. or higher, or in the case where a time of 20 minutes has elapsed since the start of the kneading step, the controller 11F activates the solenoid 10 via the drive circuit and hence actuates the added-food feeder 26. Accordingly, the feed of added food into the bread baking mold 3 is automatically executed by the added-food feeder 22. After the added-food feed, the controller 11F continues the kneading step for a given constant time, for example, 3 minutes, independent of the temperature detected by the temperature sensor 7.

Subsequently, the kneading step is replaced by a first fermenting step. During the first fermenting step, the controller 11F activates a heater 2 via the drive circuit and executes temperature control. After the first fermenting step has been completed, the controller 11F activates the motor 4 via the drive circuit so that mixing vanes (kneading vanes) 6 rotate. The rotation of the mixing vanes 6 removes gas from dough (paste of bread). In this way, a gas removing step is executed. Then, the controller 11F sequentially executes a second fermenting step, a gas removing step, a shaping and fermenting step, and a baking step.

Eleventh Embodiment

Figure 29:
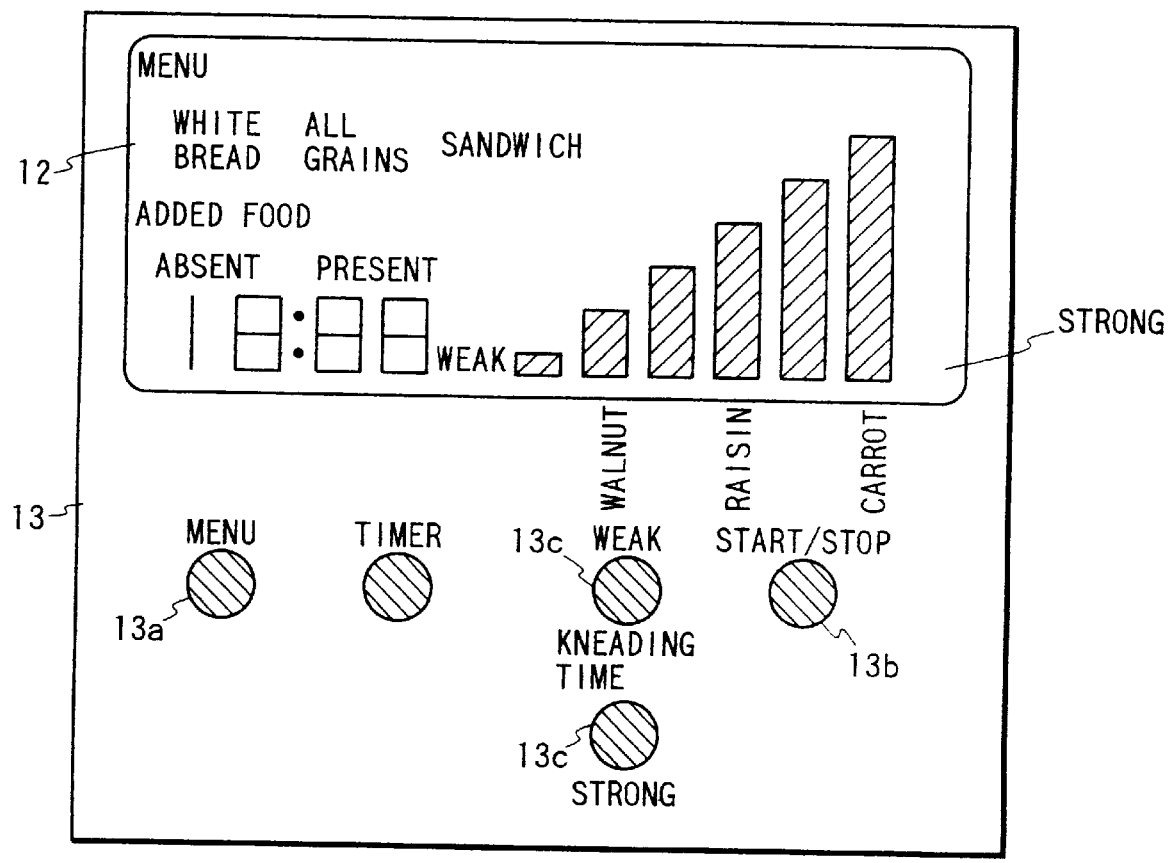
FIG. 29 is a plan view of a display and an operation device in an automatic bread producing apparatus according to an eleventh embodiment of this invention.

FIG. 29 shows an eleventh embodiment of this invention which is similar to the embodiment of FIG. 27 except for design changes indicated hereinafter. The embodiment of FIG. 29 includes a display 12 and an operation device 13. The operation device 13 has a menu key 13a, a start/stop key 13b, and a pair of kneading time keys 13c.

Figure 30:
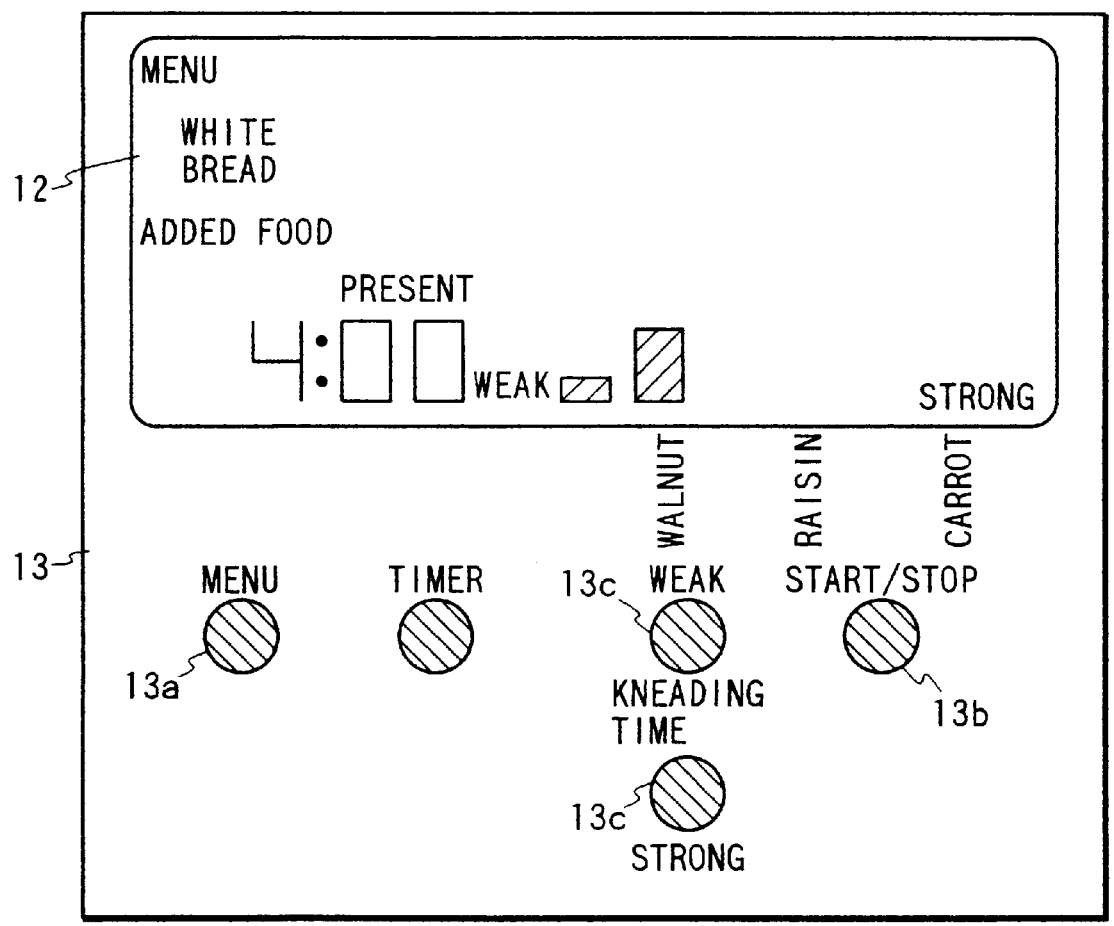
FIG. 30 is a plan view of the display and the operation device in the eleventh embodiment.

A controller is programmed to execute the following functions. In the case where the menu key 13a is depressed to set a menu corresponding to white bread and presence of added food, when one of the kneading time keys 13c is operated to provide matching with walnut fragments, information indicated on the display 12 is changed to a state of FIG. 30. Upon the depression of the start/stop key 13b, a bread producing process is started. During a kneading step in the bread producing process, the feed of walnut fragments into a bread baking mold is automatically executed by an added-food feeder. After the walnut feed, kneading is further executed to mix the walnut fragments into dough (paste of bread) for a time shorter than the corresponding time related to raisins. The time interval of the kneading step can be arbitrarily set.

Twelfth Embodiment

Figure 31:
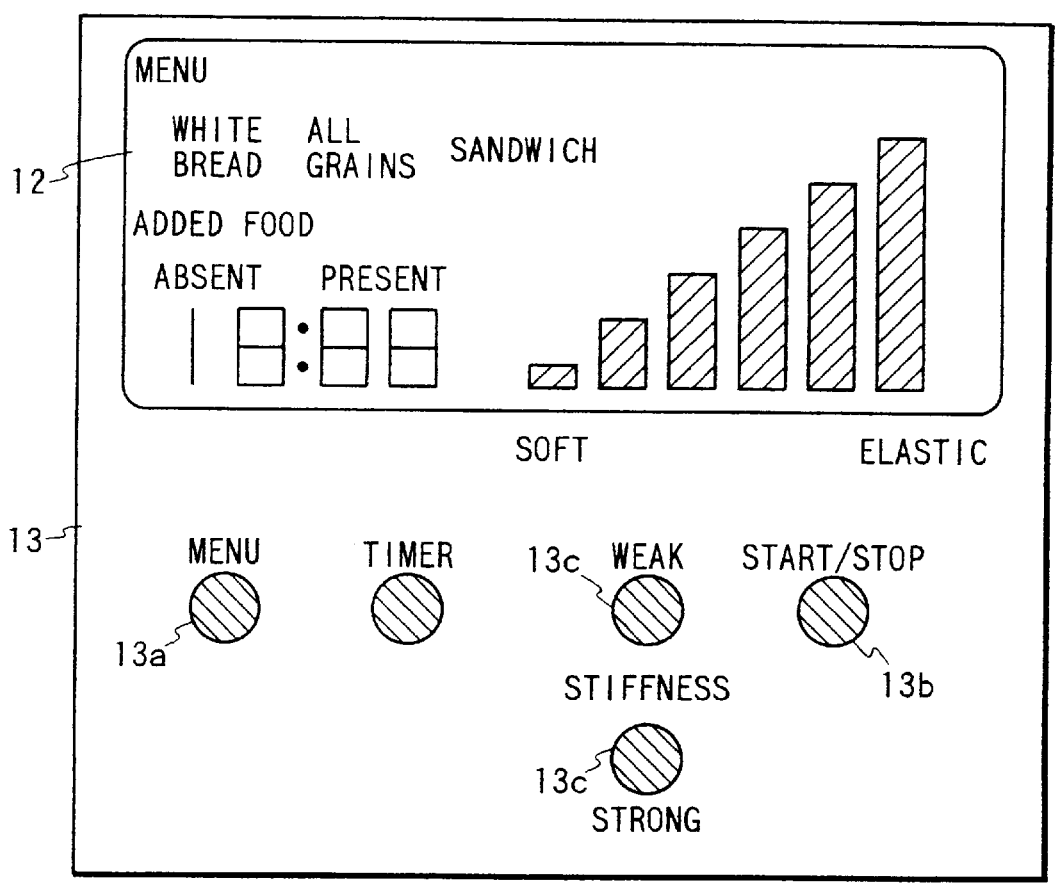
FIG. 31 is a plan view of a display and an operation device in an automatic bread producing apparatus according to a twelfth embodiment of this invention.

FIG. 31 shows a twelfth embodiment of this invention which is similar to the embodiment of FIG. 27 except for design changes indicated hereinafter. The embodiment of FIG. 31 includes a display 12 and an operation device 13. The operation device 13 has a menu key 13a, a start/stop key 13b, and a pair of hardness keys 13c.

Figure 32:
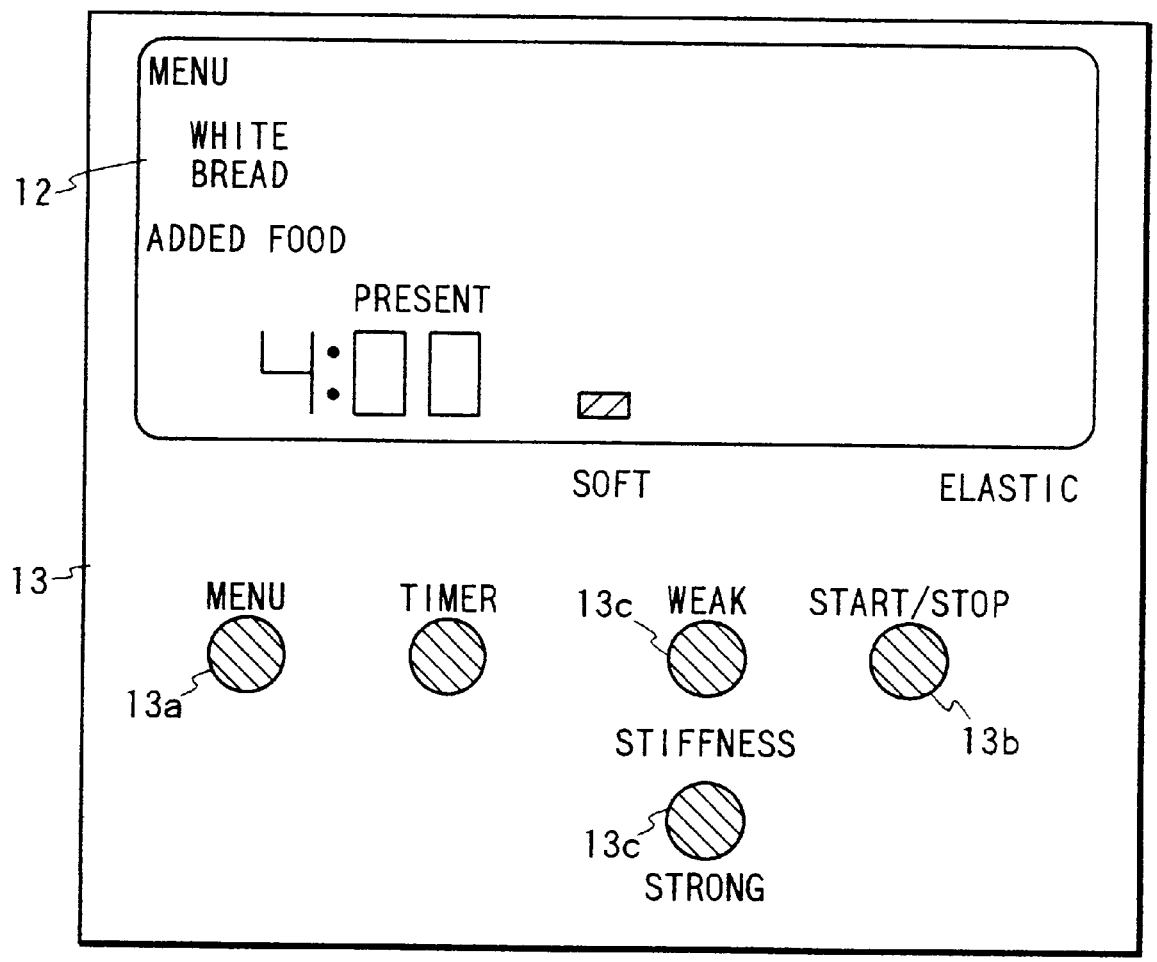
FIG. 32 is a plan view of the display and the operation device in the twelfth embodiment.

A first half amount of flour and other bread ingredients are placed in a bread making mold. Then, a second half of flour is placed in an added-food feeder 26 (see FIG. 27). A controller is programmed to execute the following functions. In the case where the menu key 13a is depressed to set a menu corresponding to white bread and presence of added food, when one of the hardness keys 13c is operated to set the stiffness to "soft", information indicated on the display 12 is changed to a state of FIG. 32. Upon the depression of the start/stop key 13b, a bread producing process is started.

Figure 33:
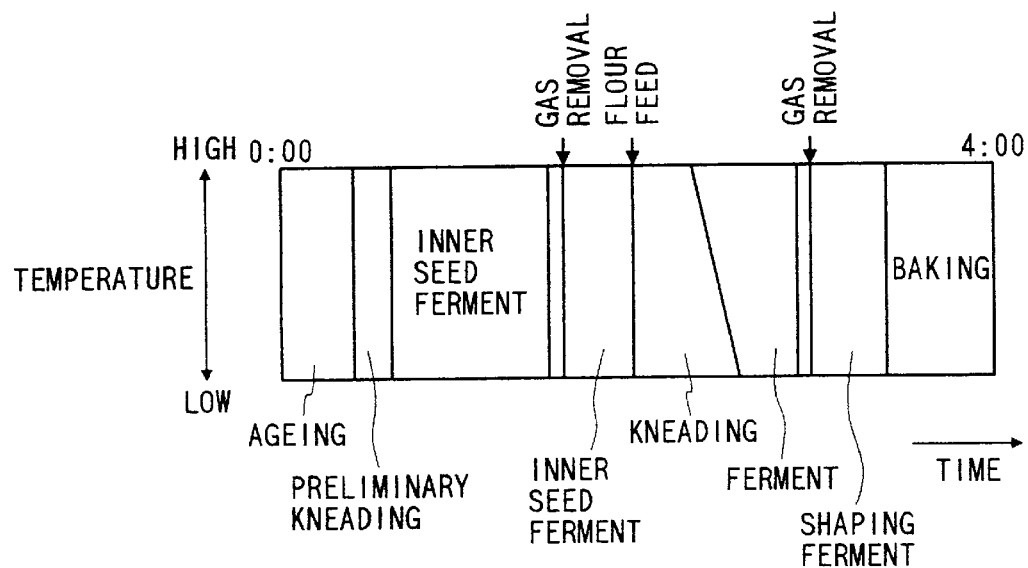
FIG. 33 is a time-domain diagram of a sequence of steps in a bread producing process executed by the apparatus in the twelfth embodiment.

FIG. 33 shows a bread producing process executed by the embodiment of FIG. 31. During an aging step (a resting step), a heater 2 (see FIG. 27) is activated to implement constant-temperature control. The aging step is followed by a preliminary kneading step during which a motor 4 (see FIG. 27) is activated to rotate mixing vanes 6 (see FIG. 27). Then, during an inner seed fermenting step, the heater 2 (see FIG. 27) is activated to implement temperature control. After the inner seed fermenting step, the motor 4 (see FIG. 27) is activated to rotate the mixing vanes 6 (see FIG. 27) and thus to remove gas from dough (paste of bread). Accordingly, a gas removing step is executed. The gas removing step is successively followed by another inner seed fermenting step and a kneading step. At a start of the kneading step, a solenoid 10 (see FIG. 27) is driven so that the feed of the second half amount of flour into the bread baking mold is automatically executed by the added-food feeder 26 (see FIG. 27). The time interval of the kneading step is adjusted in accordance with the stiffness set via the hardness keys 13c. The time interval of the kneading step is set relatively short when the required stiffness corresponds to "soft". The time interval of the kneading step is set relatively long when the required stiffness corresponds to "elastic". The kneading step is successively followed by a fermenting step, a gas removing step, a shaping and fermenting step, and a baking step.

Thirteenth Embodiment

Figure 34:
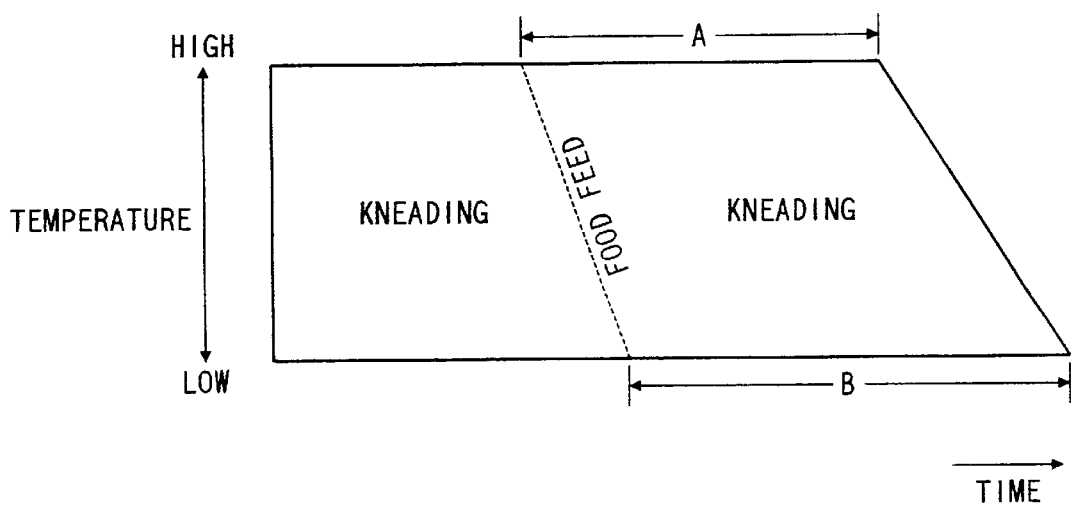
FIG. 34 is a time-domain diagram of a kneading step executed by an automatic bread producing apparatus according to a thirteenth embodiment of this invention.

FIG. 34 relates to a thirteenth embodiment of this invention which is similar to the embodiment of FIG. 27 except for design changes indicated hereinafter. In the embodiment of FIG. 34, a controller is programmed to vary the time interval of a kneading step in accordance with the temperature detected by a temperature sensor 7 (see FIG. 27). Specifically, the time interval of the kneading step which occurs after the feed of added food is decreased as the temperature detected by the temperature sensor 7 (see FIG. 27) increases.

Fourteenth Embodiment

Figure 35:
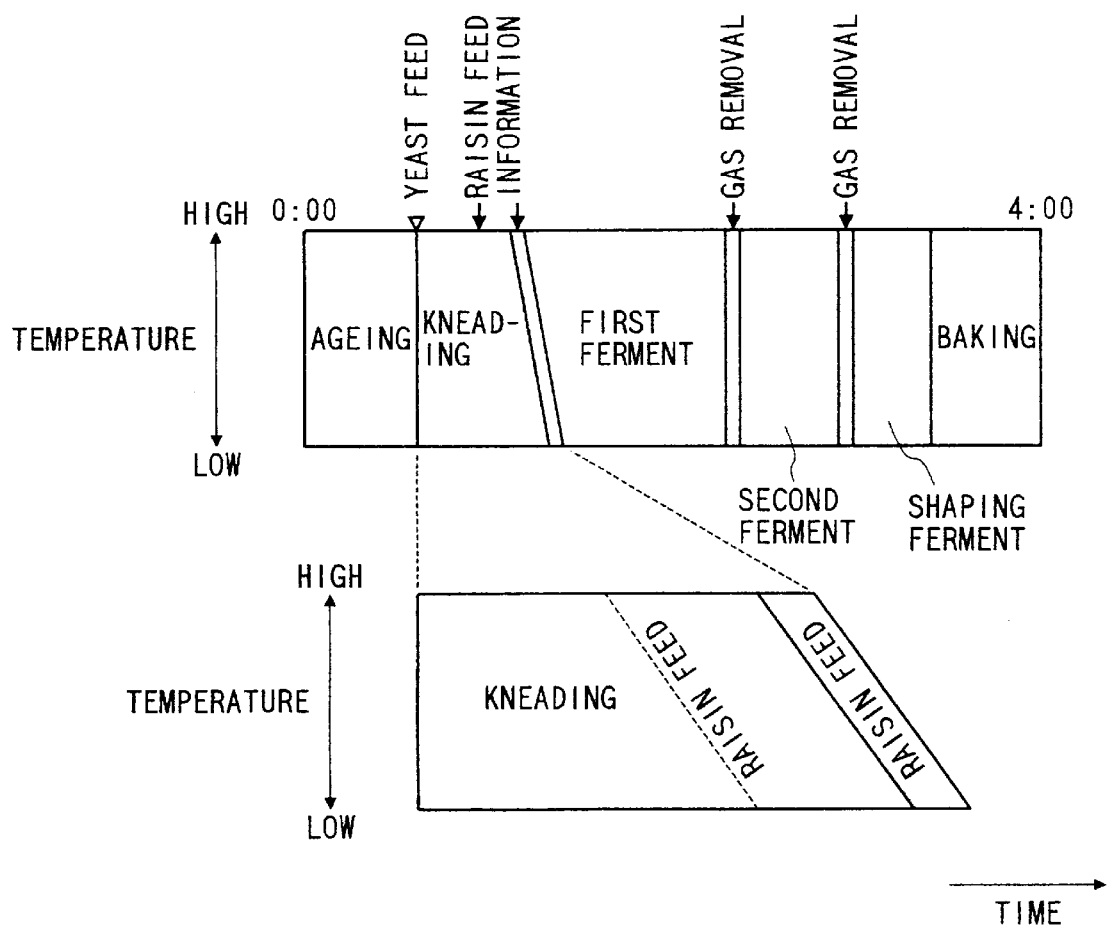
FIG. 35 is a time-domain diagram of a sequence of steps in a bread producing process executed by an automatic bread producing apparatus according to a fourteenth embodiment of this invention.

FIG. 35 relates to a fourteenth embodiment of this invention which is similar to the embodiment of FIG. 27 except for design changes indicated hereinafter. In the embodiment of FIG. 35, a controller is programmed to execute the following functions. An aging step (a resting step) is followed by a kneading step. At an intermediate point in the time interval of the kneading step, a solenoid 10 (see FIG. 27) is driven so that a part of an amount of raisins is automatically fed via an added-food feeder 26 (see FIG. 27). At an end of the kneading step, the solenoid 10 (see FIG. 27) is driven again so that the remaining part of the amount of raisins is automatically fed via the added-food feeder 22 (see FIG. 27). The kneading step is sequentially followed by a first fermenting step, a gas removing step, a second fermenting step, a gas removing step, a shaping and fermenting step, and a baking step.

It should be noted that the raisins may be replaced by walnut fragments or chocolate chips.

Fifteenth Embodiment

Figure 36:
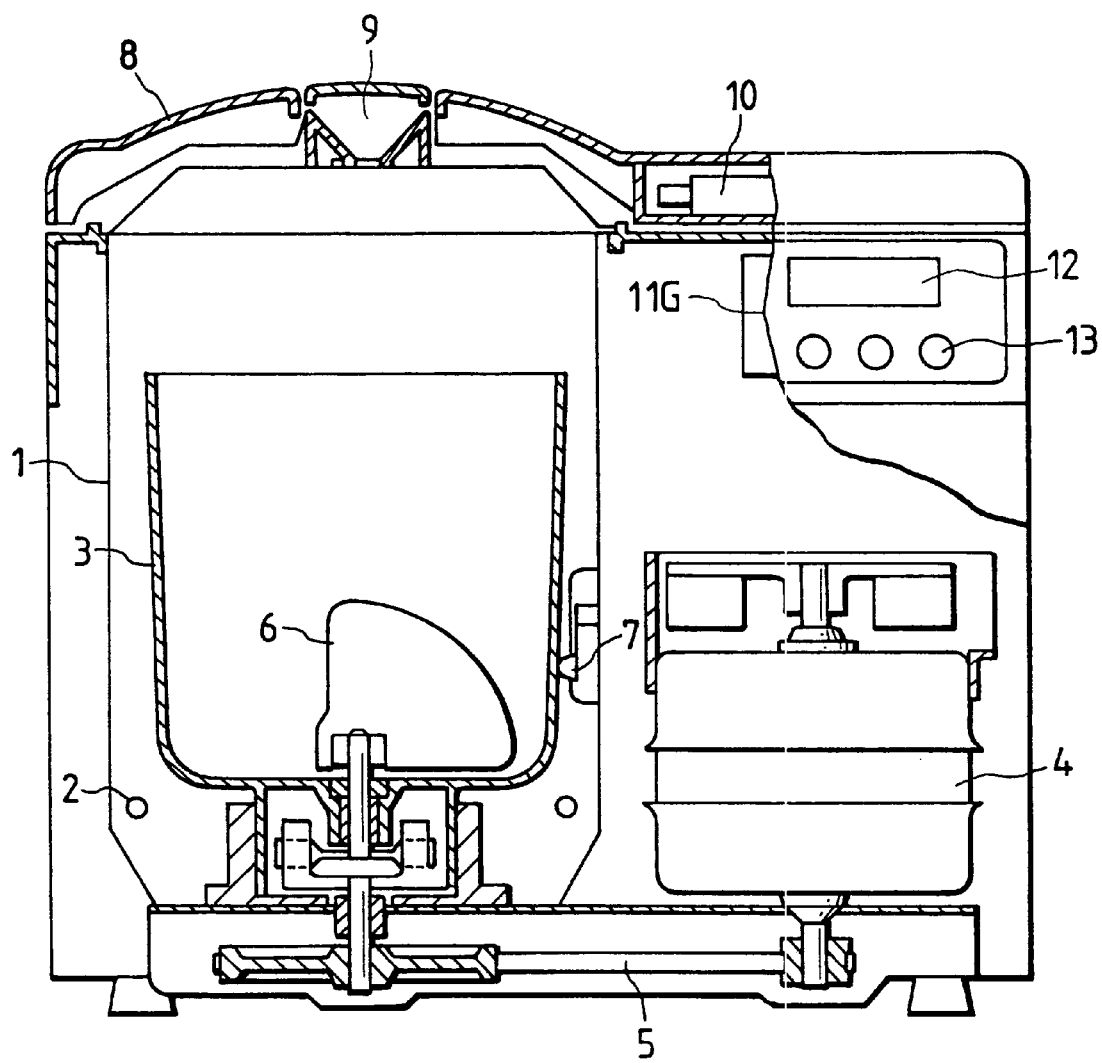
FIG. 36 is a diagram of an automatic bread producing apparatus according to a fifteenth embodiment of this invention.

FIG. 36 shows fifteenth embodiment of this invention which is similar to the embodiment of FIG. 27 except that a controller 11G replaces the controller 11F of FIG. 27, and that a display 12 connected to the controller 11G is additionally provided.

In the embodiment of FIG. 36, the controller 11G is programmed to execute the following functions. The controller 11G measures the present time. Upon the selection of a menu in response to the actuation of an operation device 13, the controller 11G calculates an expected moment of termination of a bread producing process on the basis of the present time. Specifically, the controller 11G calculates a time interval of the bread producing process in response to the selected menu, and then adds the calculated time interval of the bread producing process to the present time to determine the expected moment of termination. The controller 11G drives the display 12 in response to information of the expected moment of termination so that the display 12 will indicate the expected moment of termination. The display 12 is of, for example, the liquid-crystal type.

Figure 37:
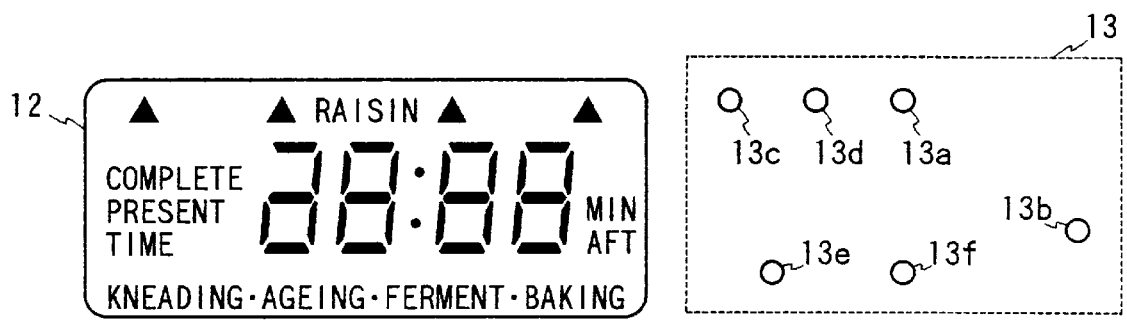
FIG. 37 is a plan view of a display and an operation device in the apparatus of FIG. 36.

As shown in FIG. 37, the display 12 has various sections such as "present time" indicating the present time, "completed" indicating the moment of termination, "minute after" indicating a time to the termination of a bread producing process, numerals denoting a moment and a time, and arrows denoting a menu. As shown in FIG. 37, the operation device 13 has a menu key 13a for the selection of a menu, a start key 13b for the start of a bread producing process, an hour key 13c for setting a time in unit of hour, a minute key 13d for setting a time in unit of minute, a reservation key 13e for setting a moment of completion and executing a timer-based processing, and a cancel key 13f for the cancellation of operation.

Figure 38:
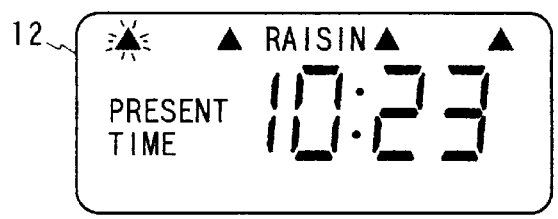
FIG. 38 is a plan view of first conditions of indication by the display in the apparatus of FIG. 36.
Figure 39:
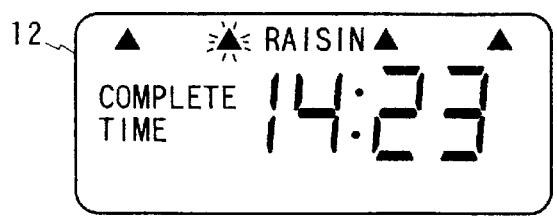
FIG. 39 is a plan view of second conditions of indication by the display in the apparatus of FIG. 36.

Before the selection of a menu, information indicated on the display 12 has a state such as shown in FIG. 38. In this case, the display 12 indicates characters "present time" and numerals denoting the present time. When a menu is selected by operating the menu key 13a, the information indicated on the display 12 is changed to a state such as shown in FIG. 39. In this case, the display 12 indicates characters "completion time", a selected menu, and the expected moment of termination of a bread producing process. It should be noted that the expected moment of termination is calculated by the controller 11G.

Sixteenth Embodiment

Figure 40:
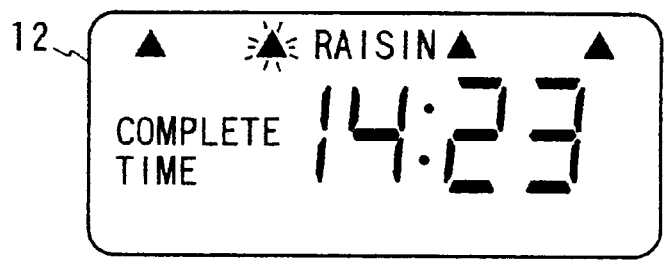
FIG. 40 is a plan view of first conditions of indication by a display in an automatic bread producing apparatus according to a sixteenth embodiment of this invention.
Figure 41:
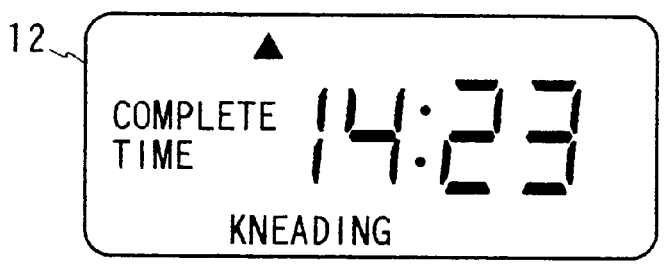
FIG. 41 is a plan view of second conditions of indication by the display in the sixteenth embodiment.
Figure 42:
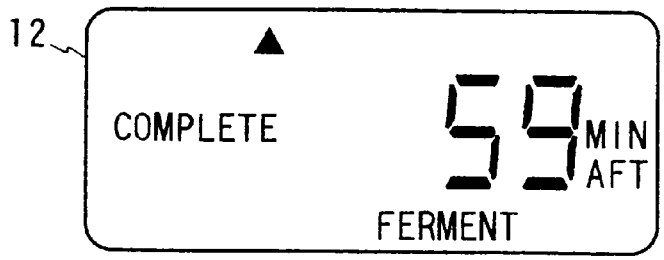
FIG. 42 is a plan view of third conditions of indication by the display in the sixteenth embodiment.

FIGS. 40, 41, and 42 relate a sixteenth embodiment of this invention which is similar to the embodiment of FIG. 36 except for design changes indicated hereinafter. In the embodiment of FIGS. 40, 41, and 42, a controller is programmed to execute the following functions.

During the selection of a menu, information indicated on a display 12 has a state such as shown in FIG. 40. In this case, arrows in the display 12 which correspond to a selected menu are intermittently activated or illuminated. Further, the display 12 indicates characters "completion time" and numerals denoting an expected time of termination of a bread producing process.

In the case where a start key 13b (see FIG. 37) is operated to start a bread producing process after the selection of the menu, the information indicated on the display 12 is changed to a state such as shown in FIG. 41. In this case, the display 12 indicates an arrow corresponding to the selected menu, characters "completion time", and an expected moment of termination of the bread producing process which depends on the selected menu.

When the present time is less than one hour to the expected moment of termination of the bread producing process, the information indicated on the display 12 is changed to a state such as shown in FIG. 42. In this case, the display 12 indicates the arrow corresponding to the selected menu, the characters "completion time", characters "minute after", and a remaining time to the expected moment of termination of the bread producing process.

Figure 43:
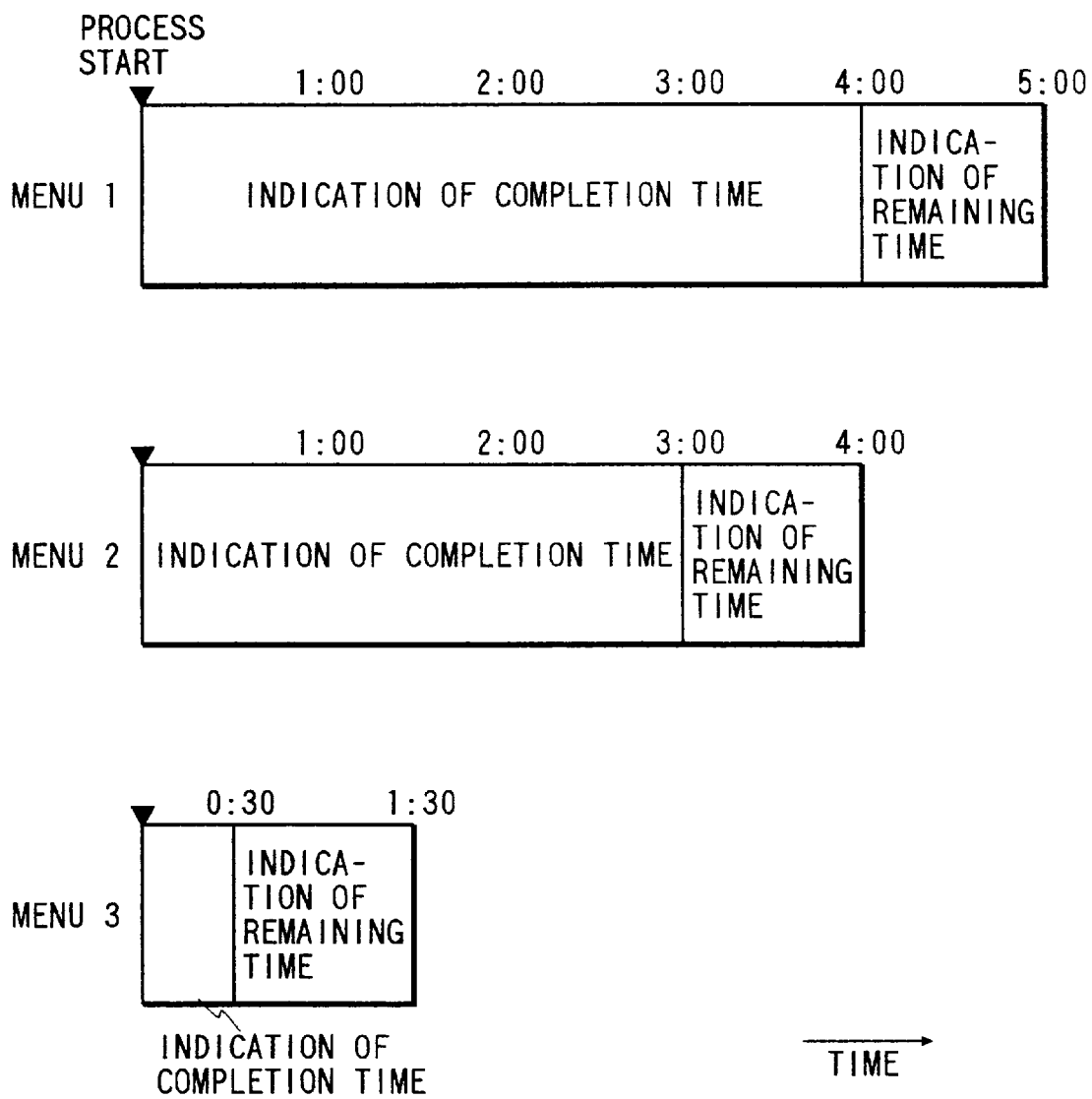
FIG. 43 is a diagram of the relation between menus and conditions of control of the display in the sixteenth embodiment.

As shown in FIG. 43, control of the display 12 depends on the selected menu. In the case where a menu "1" is selected, the display 12 remains operated in a mode corresponding to the indication format in FIG. 41 during 4 hours from the start of a bread producing process. Then, the display 12 holds operated in a mode corresponding to the indication format in FIG. 42 during 1 hour until the termination of the bread producing process. In the case where a menu "2" is selected, the display 12 remains operated in a mode corresponding to the indication format in FIG. 41 during 3 hours from the start of a bread producing process. Then, the display 12 holds operated in a mode corresponding to the indication format in FIG. 42 during 1 hour until the termination of the bread producing process. In the case where a menu "3" is selected, the display 12 remains operated in a mode corresponding to the indication format in FIG. 41 during 30 minutes from the start of a bread producing process. Then, the display 12 holds operated in a mode corresponding to the indication format in FIG. 42 during 1 hour until the termination of the bread producing process.

Figure 44:
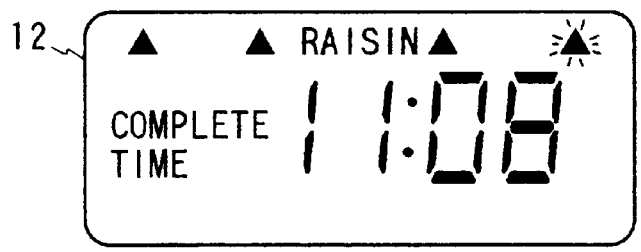
FIG. 44 is a plan view of fourth conditions of indication by the display in the sixteenth embodiment.
Figure 45:
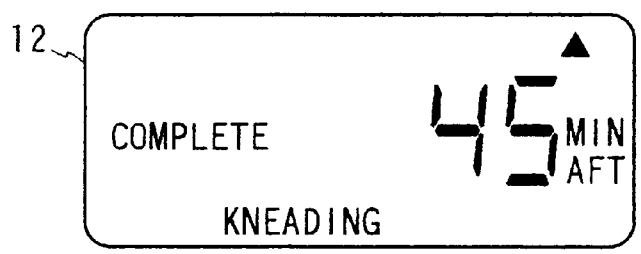
FIG. 45 is a plan view of fifth conditions of indication by the display in the sixteenth embodiment.

In the case where a selection is given of a menu corresponding to a bread producing process having a duration time shorter than 1 hour, the display 12 is initially controlled to indicate a completion time as shown in FIG. 44. Then, the display 12 is driven to indicate a remaining time to the termination of the bread producing process as shown in FIG. 45.

Figure 46:
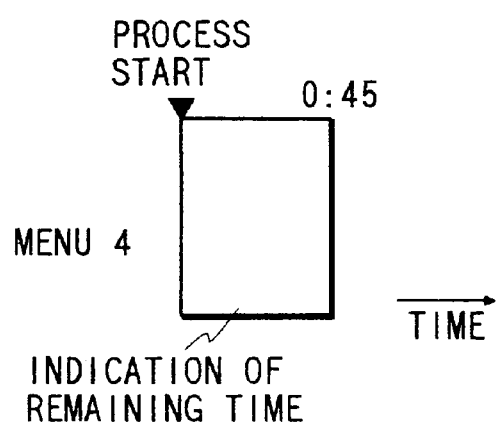
FIG. 46 is a time-domain diagram of conditions of control of the display in the sixteenth embodiment.

In the case where a selection is given of a menu corresponding to a bread producing process having a duration time shorter than 1 hour, the display 12 may be continuously controlled to indicate a remaining time to the termination of the bread producing process as shown in FIG. 46.

Seventeenth Embodiment

Figure 47:
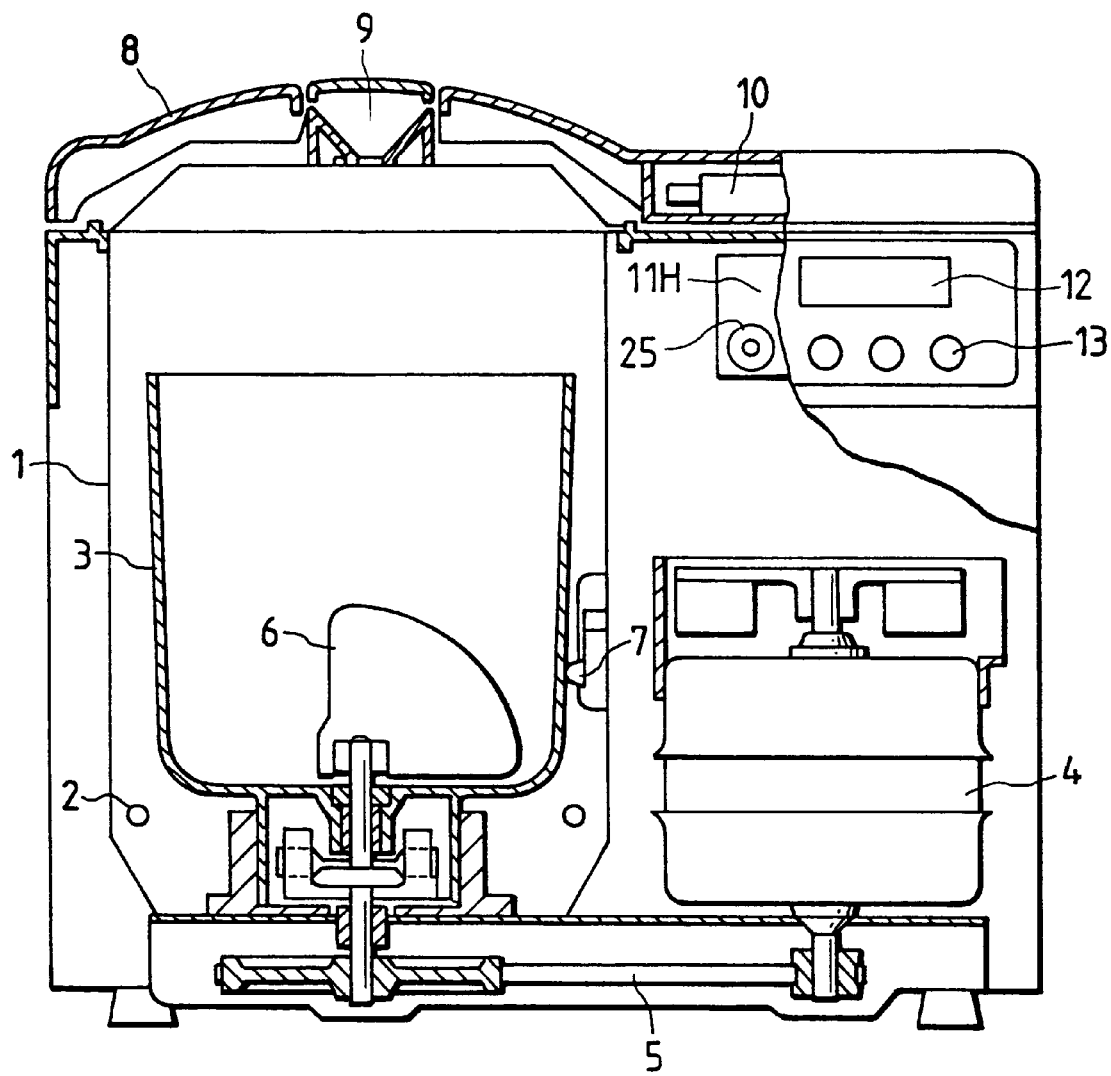
FIG. 47 is a diagram of an automatic bread producing apparatus according to a seventeenth embodiment of this invention.
Figure 48:
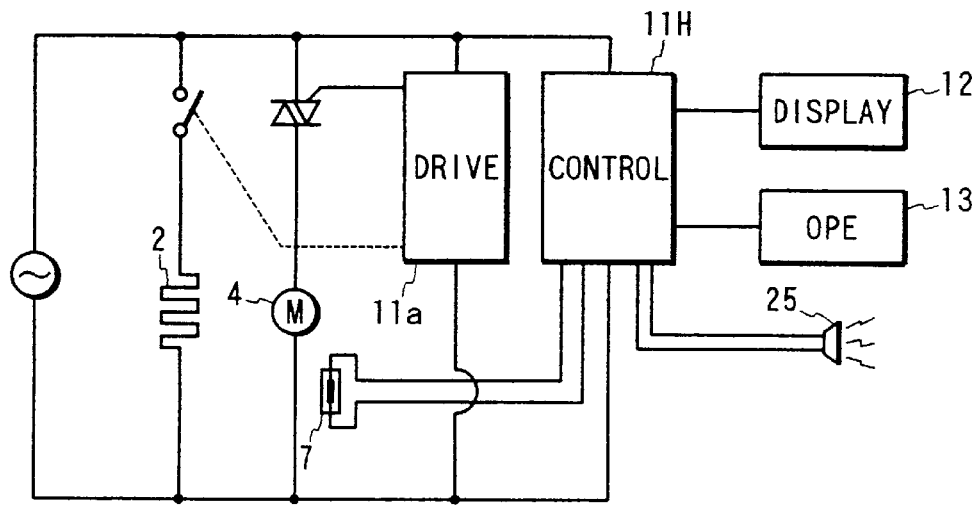
FIG. 48 is a diagram of an electric part of the apparatus of FIG. 47.

FIGS. 47 and 48 show a seventeenth embodiment of this invention which is similar to the embodiment of FIG. 36 except that a controller 11H replaces the controller 11G of FIG. 36, and that a sound generator 25 connected to the controller 11H is additionally provided. In the embodiment of FIGS. 47 and 48, the controller 11H is programmed to execute the following functions.

A bread producing process is started in response to the actuation of an operation device 13. During the bread producing process, after an aging step (a resting step), a solenoid 10 is activated to unblock an opening 9 and yeast is fed via the opening 9. Then, a motor 4 is activated to rotate mixing vanes (kneading blades) 6 and hence to execute a kneading step. The kneading step is sequentially followed by a first fermenting step, a second fermenting step, a shaping and fermenting step, and a baking step. When the bread producing process has been completed, the sound generator 25 and a display 12 are driven and activated to inform a user of the completion of the bread producing process.

Figure 49:
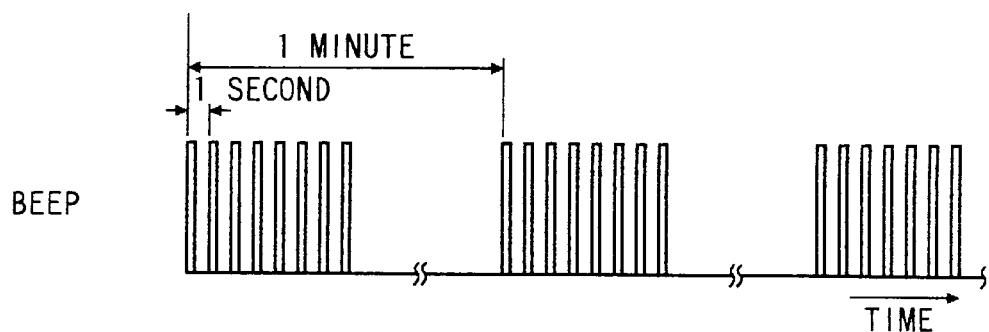
FIG. 49 is a time-domain diagram of a sound signal in the apparatus of FIG. 47.

As shown in FIG. 49, the sound generator 25 produces a train of beep pulses each having a duration time of 0.3 second. Specifically, the generation of a beep pulse is repeated 8 times at a period of 1 second. In the case where completed bread remains within an apparatus body although the train of beep pulses has been generated, a second train of beep pulses is produced from the sound generator 25. The second train follows the first train by an interval of 1 minute. As long as the completed bread remains within the apparatus body, the generation of the beep pulse train continues to be periodically repeated until a moment which follows the completion of the bread producing process by 5 minutes.

In the case where the completed bread is removed from the apparatus body in 5 minutes from the completion of the bread producing process, the sound generator 25 is deactivated when a power supply switch is changed to an off position or when a stop switch (a stop key) is actuated.

An additional switch may be provided which responds to the removal of a bread baking mold 3 from the apparatus body. The additional switch is of, for example, the type responding to motion of a lid 8. The additional switch is connected to the controller 11H. It is preferable that the sound generator 25 is automatically deactivated in response to the actuation of the additional switch.

Figure 50:
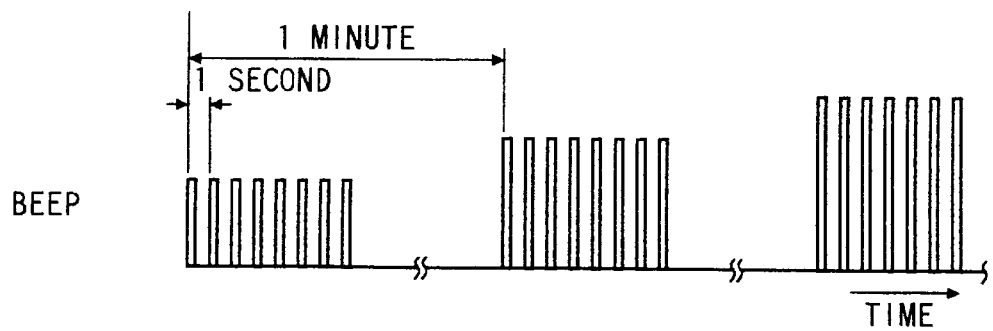
FIG. 50 is a time-domain diagram of a sound signal in the apparatus of FIG. 47.

As shown in FIG. 50, the intensity of a beep pulse train may be greater than the intensity of a immediately-preceding beep pulse train.

Eighteenth Embodiment

Figure 51:
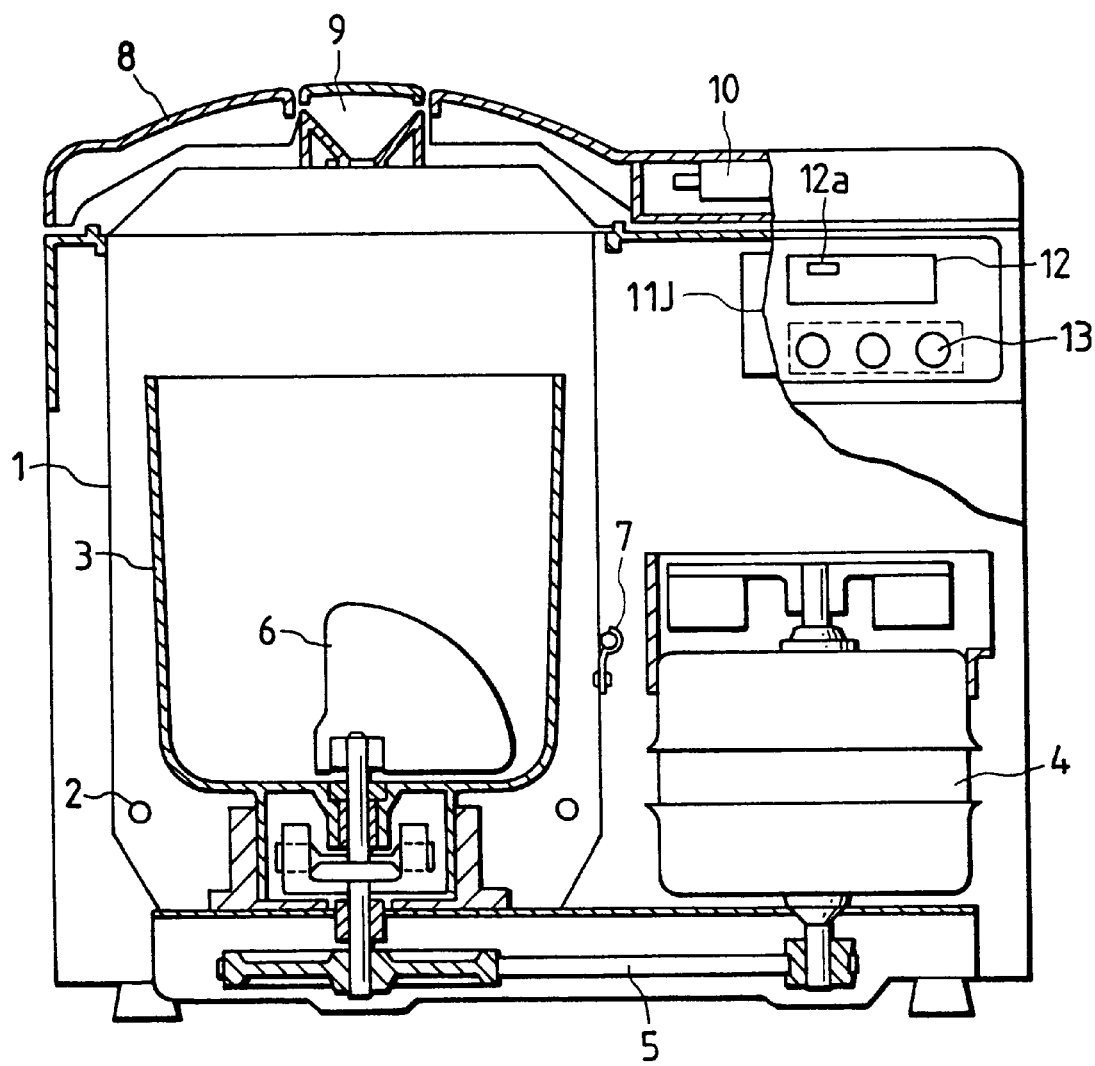
FIG. 51 is a diagram of an automatic bread producing apparatus according to an eighteenth embodiment of this invention.
Figure 52:
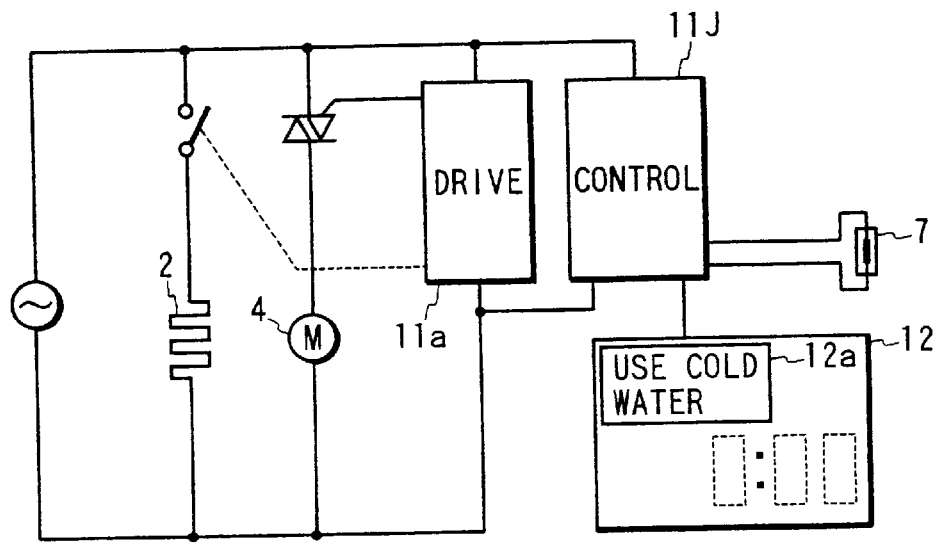
FIG. 52 is a diagram of an electric part of the apparatus of FIG. 51.

FIGS. 51 and 52 show an eighteenth embodiment of this invention which is similar to the embodiment of FIG. 36 except that a controller 11J replaces the controller 11G of FIG. 36. In the embodiment of FIGS. 51 and 52, a display 12 has a section 12a for indicating "use cold water". In the embodiment of FIGS. 51 and 52, the controller 11J is programmed to execute the following functions.

Figure 53:
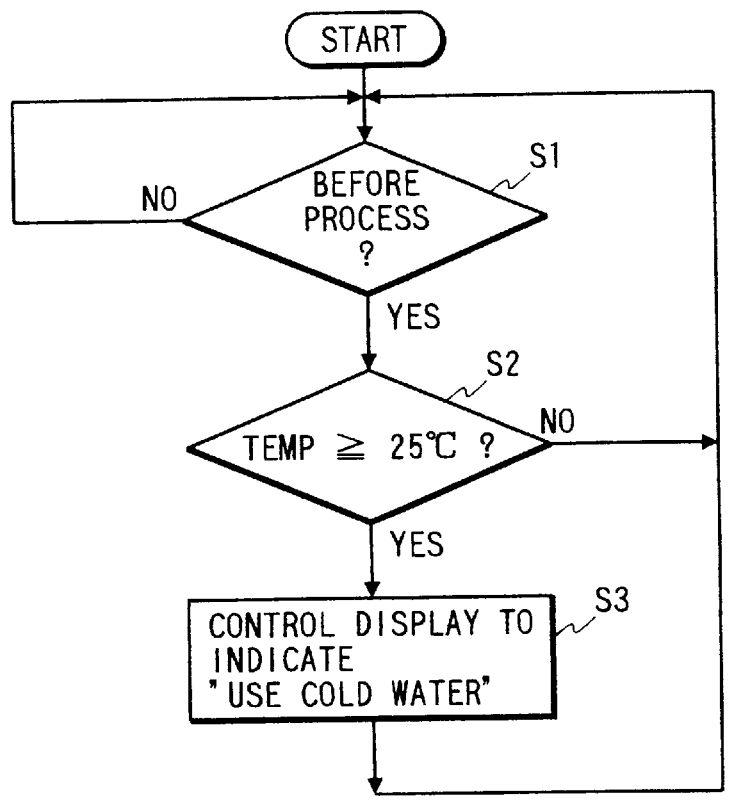
FIG. 53 is a flowchart of a segment of a program for operating a controller in the apparatus of FIG. 51.

The controller 11J operates in accordance with a program stored in an internal ROM. FIG. 53 is a flowchart of a segment of the program which relates to control of the display segment 12a. With reference to FIG. 53, a first step S1 of the program segment decides whether or not a bread producing process has been not yet started. In the case where a bread producing process has been not yet started, the program advances from the step S1 to a step S2. Otherwise, the step S1 is repeated. The step S2 derives the current temperature within a baking chamber 1 from the output signal of a temperature sensor 7. In this case, the derived temperature within the baking chamber 1 corresponds to a room temperature. Further, the step S2 compares the current temperature within the baking chamber 1 (the room temperature) with a reference temperature equal to, for example, 25° C. When the current temperature within the baking chamber 1 (the room temperature) is higher than the reference temperature, the program advances from the step S2 to a step S3. Otherwise, the program returns to the step S1. The step S3 controls the display 12 so that its segment 12a will indicate "use cold water". This indication on the display segment 12a urges a user to employ cold water in bread ingredients. After the step S3, the program returns to the step S1.

It should be noted that the indication of "use cold water" may be erased from the display segment 12a upon detection of the employment of cold water. In the case where cold water is not employed after the indication of "use cold water", warning sound may be generated or apparatus operation may be stopped.

What is claimed is:
1. An automatic bread producing apparatus comprising:
   first means for executing a step of mixing bread ingredients;
   second means for adding a food into a mixture of the bread ingredients at a moment during the mixing step executed by the first means;

third means for enabling the first means to continue the mixing step during a constant time after the moment of adding the food into the mixture by the second means;

fourth means for detecting a room temperature;

fifth means for adjusting a time interval of the mixing step executed by the first means in response to the room temperature detected by the fourth means; and sixth means for adjusting the moment of adding the food into the mixture by the second means in response to the room temperature detected by the fourth means so that a part of the time interval of the mixing step executed by the fist means which occurs after the moment of adding the food into the mixture will be equal to the constant time.

2. The automatic bread producing apparatus of claim 1, wherein the second means comprises means for adding a first portion of the food into the mixture at a first moment during the mixing step, and means for adding a second portion of the food into the mixture at a second moment diferent from said first moment during the mixing step, the second portion differing from the first portion.

3. An automatic bread producing apparatus comprising:

a baking chamber;

a temperature sensor for detecting a temperature within the baking chamber:

first means for executing a step of mixing bread ingredients;

second means for adding a food into a mixture of the bread ingredients at a moment during the mixing step executed by the first means;

third means for enabling the first means to continue the mixing step during an adjustable time after the moment of adding the food into the mixture by the second means; and fourth means for adjusting the adjustable time in response to the temperature within the baking chamber which is detected by the temperature sensor.

4. An automatic bread producing apparatus comprising:

first means for executing a step of mixing bread ingredients;

second means for adding a food into a mixture of the bread ingredients at a moment during the mixing step executed by the first means;

third means for enabling the first means to continue the mixing step during an adjustable time after the moment of adding the food into the mixture by the second means; and fourth means for adjusting the adjustable time in response to conditions of a bread producing process.

* * * * *